United States Patent
Kato et al.

(10) Patent No.: US 7,287,261 B2
(45) Date of Patent: Oct. 23, 2007

(54) DISC-POSITIONING MECHANISM FOR CAR-MOUNTED DISC PLAYER

(75) Inventors: Kazunari Kato, Iwaki (JP); Ichiro Kato, Iwaki (JP); Toshiyuki Fukushima, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 945 days.

(21) Appl. No.: 10/619,977

(22) Filed: Jul. 15, 2003

(65) Prior Publication Data

US 2004/0076104 A1    Apr. 22, 2004

(30) Foreign Application Priority Data

Jul. 19, 2002    (JP)    ............................ 2002-211550

(51) Int. Cl.
G11B 17/04    (2006.01)

(52) U.S. Cl. .................................. 720/604

(58) Field of Classification Search ............... 720/604
See application file for complete search history.

(56) References Cited

U.S. PATENT DOCUMENTS

| | | | | |
|---|---|---|---|---|
| 4,674,079 A | * | 6/1987 | Agostini | 720/623 |
| 4,733,387 A | * | 3/1988 | Yoshimura | 720/620 |
| 5,022,023 A | * | 6/1991 | Toyoguchi | 720/624 |
| 5,142,522 A | | 8/1992 | Muramatsu et al. | |
| 5,416,763 A | * | 5/1995 | Ohsaki | 720/623 |
| 6,256,280 B1 | * | 7/2001 | Sakurai et al. | 720/620 |
| 6,330,216 B1 | * | 12/2001 | Nishimura et al. | 720/623 |
| 6,782,545 B2 | * | 8/2004 | Kuo | 720/620 |
| 6,964,058 B2 | * | 11/2005 | Fujimura | 720/714 |
| 6,978,467 B1 | * | 12/2005 | Fukushima et al. | 720/624 |
| 7,007,285 B2 | * | 2/2006 | Suzuki | 720/621 |

* cited by examiner

*Primary Examiner*—Angel Castro
(74) *Attorney, Agent, or Firm*—Brinks Hofer Gilson & Lione

(57) ABSTRACT

A disc-positioning mechanism of a car-mounted disc player includes drive chassis having at least a turntable and a pickup; a clamper-supporting member movable so as to come close to or detach away from the drive chassis; a clamper rotatably supported on the clamper-supporting member and being able to clamp a disc between the clamper and the turntable; and at least one positioning member abutting against the outer periphery of a disc inserted from a slot of the disc player so as to position the disc with respect to the turntable. The positioning member includes an abutment abutting against the outer periphery of the disc and a regulatory portion extending farther toward the slot than the abutment and is supported on either one component of the drive chassis and the clamper-supporting member, and the regulatory portion abuts against the other component.

24 Claims, 19 Drawing Sheets

DISC-POSITIONING MECHANISM FOR CAR-MOUNTED DISC PLAYER

BACKGROUND

1. Field of the Invention

The present invention relates to disc players for writing information in a disc such as a compact disc (CD) or a digital versatile disc (DVD) and/or for reading information written therein. Further, the preferred embodiments of the present invention relate to a disc-positioning mechanism for positioning an inserted disc with respect to a turntable.

2. Description of the Related Art

Car-mounted disc players typically have a drive chassis having a photo pickup, a turntable, and an arm clamp that is operable to move up and down such that a disc is chucked (clamped) by the turntable and a clamper rotatably supported on the arm clamp. Although the arm clamp is urged so as to come close to the drive chassis, during ejection (in a standby state) in which the disc is not loaded on the disc player or during transfer of the disc, the arm clamp remains above the drive chassis in order to hold the clamper in a position away from the turntable. Meanwhile, when the disc is transferred to a playing position, the arm clamp moves down in order to come close to the drive chassis, and the disc is then chucked by the clamper and the turntable. The drive chassis has a disc-positioning mechanism disposed thereon, and the disc transferred to the playing position is properly positioned with respect to the turntable by the disc-positioning mechanism. In such a car-mounted disc player, either of small and large discs having diameters of, for example, 8 cm and 12 cm is inserted for reading and/or writing information. Therefore, the disc-positioning mechanism is required to position both discs having different diameters from each other with respect to the turntable.

Such a known disc-positioning mechanism has a structure in which the arm clamp has a pair of positioning members movably supported thereon, each having a pin disposed thereon in a hanging manner and protruding in a transfer route of the disc. In such a disc-positioning mechanism having the above-described structure, when a small disc is inserted in the disc player, the outer periphery of the disc abuts against the pins remaining at respective predetermined positions so that the disc is positioned with respect to the turntable. When a large disc is inserted in the disc player, the outer periphery of the disc abuts against the pair of pins while the disc is being transferred to the playing position, and then the positioning members move together with the disc. Thus, when the large disc reaches the playing position, the positioning members having the respective pins come to a halt, whereby the center of the large disc is properly positioned with respect to the turntable.

However, in the foregoing known the disc-positioning mechanism, when an external vibration, shock, or the like is exerted on the disc player during transfer of the disc, sometimes the disc which is being transferred to the playing position does not abut against the pins and hence passes over below the pins, thereby causing the positioning members not to work properly and resulting in a chucking failure of the disc. Likewise, such a problem occurs when the positioning members are provided on the drive chassis side. In this case, a vibration or other disruption may cause the disc to pass over above the pins, resulting in a chucking failure.

SUMMARY OF THE INVENTION

It is an object of the present invention to provide a disc-positioning mechanism of a car-mounted disc player that can reliably position and chuck a disc even when a vibration, shock, or other disruption is exerted thereon during transfer of the disc.

A disc-positioning mechanism of a car-mounted disc player according to a preferred embodiment of the present invention includes a drive chassis having a turntable, a pickup; a clamper-supporting member movable so as to come close to or detach away from the drive chassis; a clamper rotatably supported on the clamper-supporting member and being able to clamp a disc between the clamper and the turntable; and at least one positioning member abutting against the outer periphery of a disc inserted from a slot of the disc player so as to position the disc with respect to the turntable. The positioning member includes an abutment abutting against the outer periphery of the disc and a regulatory portion extending farther toward the slot than the abutment and is supported on either one component of the drive chassis and the clamper-supporting member, and the regulatory portion abuts against the other component.

Because the disc-positioning mechanism for properly positioning the disc inserted from the slot with respect to the turntable is constructed such that the positioning member having the abutment abutting against the outer periphery of the disc is supported on either one component of the drive chassis and the clamper-supporting member, and the regulatory portion disposed on the positioning member extends farther toward the slot than the abutment so as to abut against the other component, even when a vibration, shock, or other disruption is exerted on the disc player while the disc is being transferred onto the turntable, the disc is reliably guided to the abutment by the regulatory portion, thereby preventing the disc from accidentally passing over the abutment. As a result, the disc is properly positioned with respect to the turntable, thereby reliably preventing a chucking failure.

In the disc-positioning mechanism having the above structure, although the regulatory portion may be turnably supported on the positioning member and elastically abut against the other component by using an elastic member such as a twisted coil spring, the regulatory portion itself is preferably made from an elastic member so as to elastically abut against the other component with its elastic force. In a preferred embodiment, the regulatory portion be made from a leaf spring and that the leaf spring have a base portion fixed to the positioning member and a free end elastically abutting against the other component. With this structure, the number of parts can be reduced, and also the regulatory portion elastically abuts against the other component without failure because of being prevented from wear-out.

Also, in the disc-positioning mechanism having the above structure, although the positioning member may be fixedly provided, in another preferred embodiment, the positioning member is movably disposed on either one of the components so as to position either of two types of small and large discs, having different diameters from each other, with respect to the turntable and that the regulatory portion slide while abutting against the other component when the positioning member moves. With this structure, even when the positioning member moves from a first position at which the small disc is positioned to a second position at which the large disc is positioned, the disc is prevented from detaching from and passing over the abutment.

In addition, in the disc-positioning mechanism having the above structure, a preferred embodiment may use a positioning member that is turnably supported on the drive chassis and a regulatory portion that extends outward from the clamper so as to elastically abut against the lower surface of the clamper-supporting member having no pickup. With this structure, it is not required to avoid the moving trajectory of the regulatory portion to overlap with that of the pickup, whereby a space necessary for the regulatory portion to move is easily provided.

In yet another embodiment of the disc-positioning mechanism, a pair of positioning members are provided, each having a toothed portion disposed at the abutment thereof such that these toothed portions engage with each other, and turn in synchronization with each other between the first and second positions. If the abutment of one of the positioning members is made from a synthetic resin and the abutment of the other positioning member is made from a metal plate, the toothed portions have a reduced frictional force therebetween, thereby allowing the two positioning members to turn smoothly.

Also, when the small disc is inserted, it is positioned by causing the outer periphery of the small disc to abut against the fronts of the abutments of the two positioning members lying at the first position, and when the large disc is inserted, it is positioned by causing the outer periphery of the large disc to abut against the inner circumferential surfaces of the abutments of the two positioning members lying at the second position. As a result, either of discs having different diameters from each other can be reliably positioned by the same positioning member.

DESCRIPTION OF THE PREFERRED EMBODIMENTS

A car-mounted disc player according to a preferred embodiment can deal with two types of discs D having diameters of 8 cm and 12 cm. Hereinafter, the small and large discs having diameters of 8 cm and 12 cm are respectively denoted by SD and LD.

Figure 1:
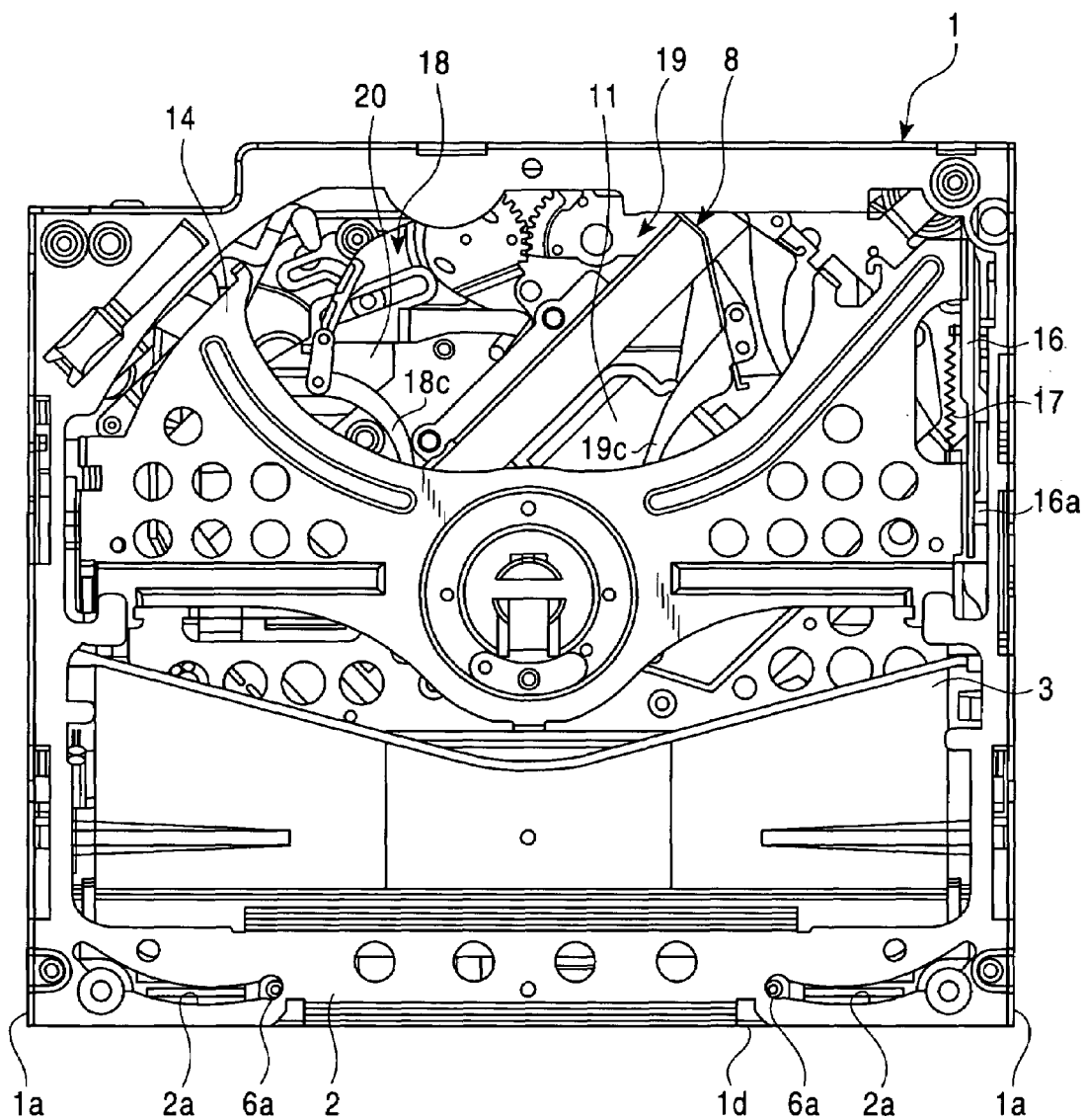
FIG. 1 is a plan view of a car-mounted disc player according to an embodiment of the present invention.
Figure 2:
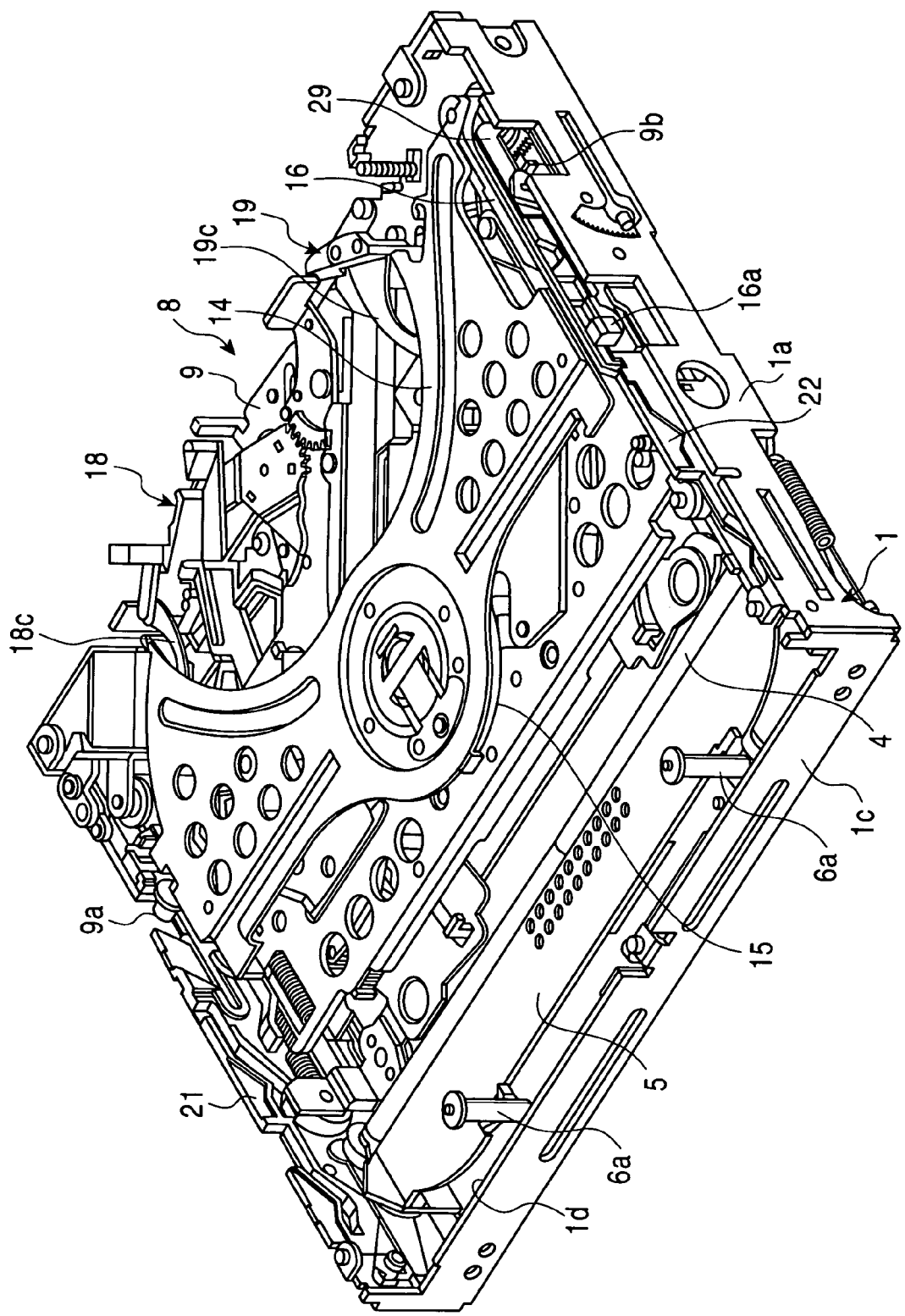
FIG. 2 is a perspective view of the disc player from which a top chassis is removed.
Figure 3:
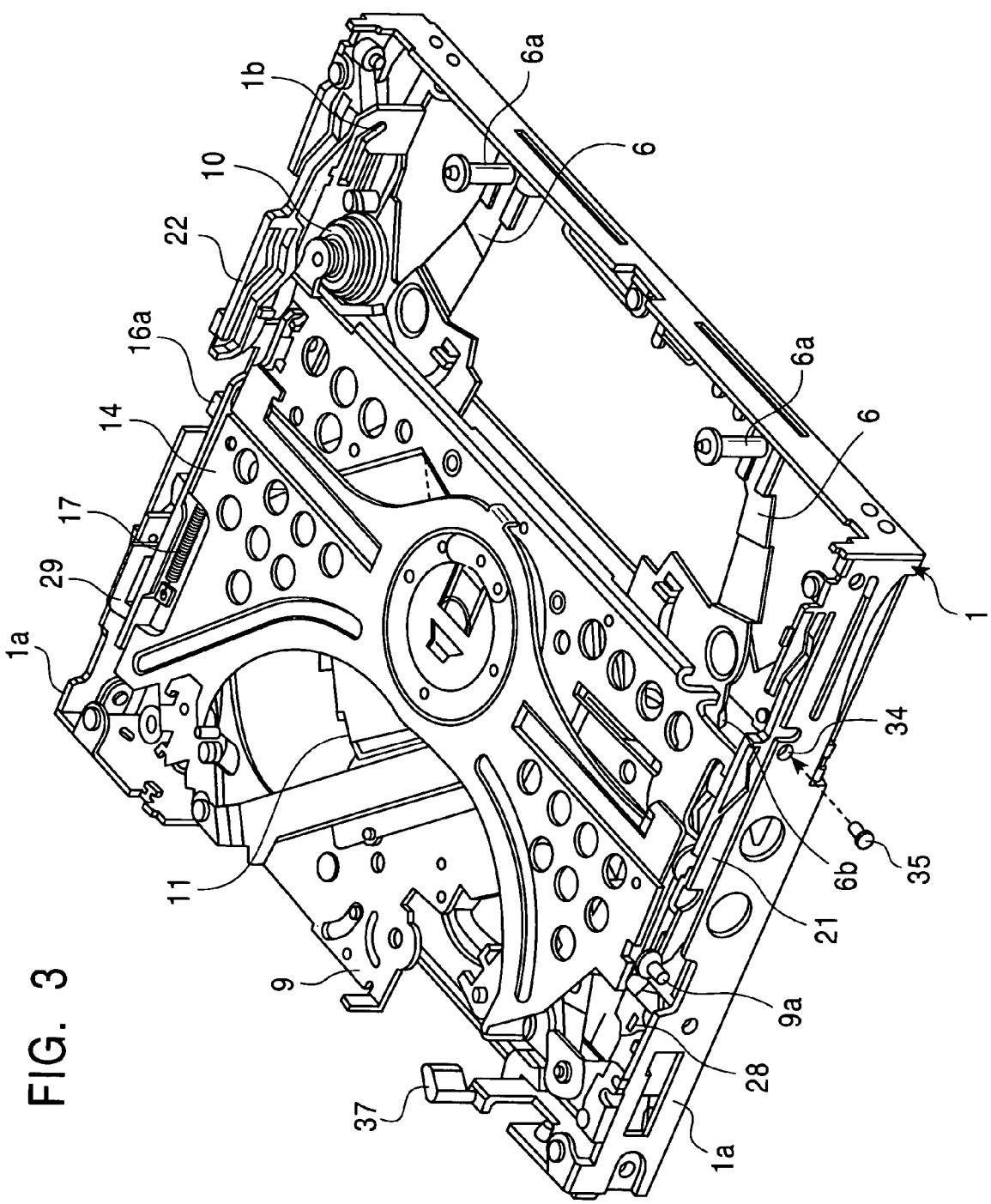
FIG. 3 is a perspective view of the disc player from which the top chassis and a guide member are removed.

As shown in FIGS. 1 to 3, the car-mounted disc player has a chassis 1 and a top chassis 2, which form an external skeleton thereof and which are made by bending a metal plate. The chassis 1 has a front plate 1c at the front thereof and a slit-like slot 1d formed by cutting the upper portion of the front plate 1c, through which a disc D (small disc SD or large disc LD) is inserted into or ejected from the disc player. The central portion of the top chassis 2 is cut out on a large scale so that the top chassis forms a frame-like shape. Also, the top chassis 2 is fixed to the upper surface of the chassis 1 with screws and has a guide member 3 and a roller 4 disposed thereunder, forming a disc-transfer mechanism.

Figure 4:
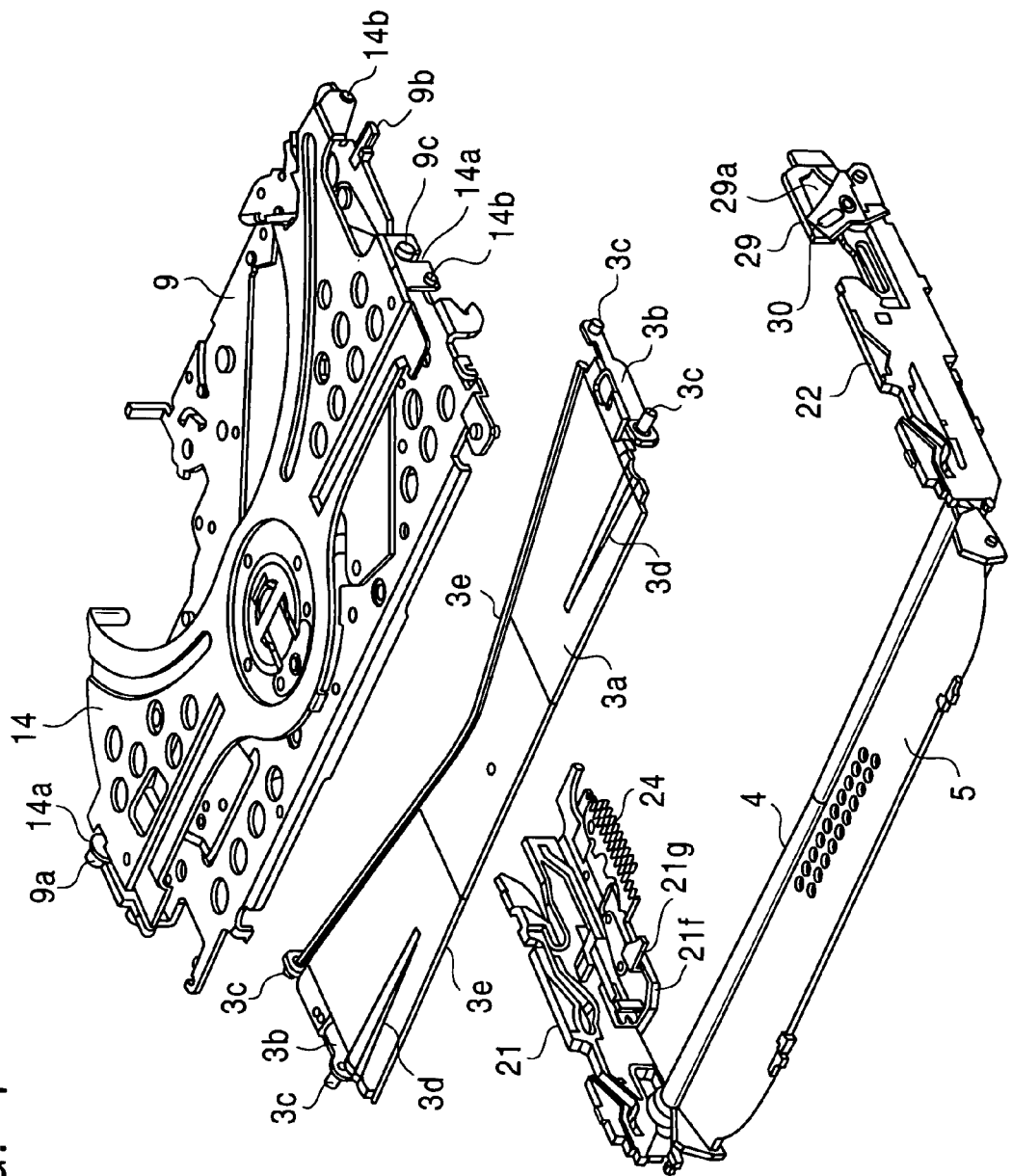
FIG. 4 is an exploded perspective view of a drive unit, the guide member, first and second slide members, and so forth provided in the disc player.

As shown in FIG. 4, the guide member 3 has a flat plate 3a and a pair of side plates 3b formed by bending the right and left sides of the flat plate 3a. Each of the side plates 3b has two drive pins implanted therein. The flat plate 3a has an under surface, each of right and left halves thereof having a gradually tapered shape, slating downward from the central portion thereof toward the right and left side plates 3b. Also, the flat plate 3a has a pair of long narrow shaped recesses 3d at the right and left portions thereof, formed so as to protrude from the lower surface to the upper surface thereof, and has a pair of bends 3e at the front and rear edges thereof protruding upward. Since the drive pins 3c are engaged with corresponding cam grooves formed in a pair of slide members, which will be described later, when the two slide members move in a back-and-forth direction in synchronization with each other, the guide member 3 moves up and down while keeping a state of being parallel to the chassis 1.

Figure 22:
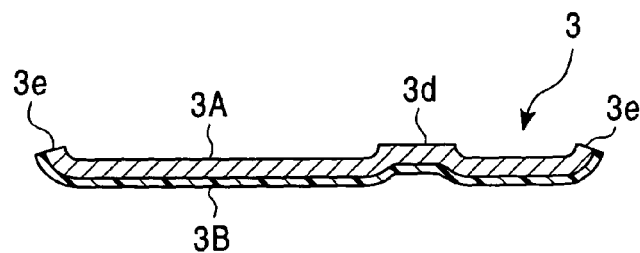
FIG. 22 is a sectional view of the guide member provided in the disc player.

As shown in FIG. 22, the guide member 3 is made by pressing a composite of a metal plate 3A and a resin layer 3B previously coated on the surface of the metal plate 3A. In this press working, the foregoing side plates 3b, recesses 3d, and bends 3e are formed. The metal plate 3A suffices as long as it has such a stiffness that its mechanical strength is sufficient for the guide member 3, and the resin layer 3B suffices as long as it has such a slippery property that the surface of the disc D is prevented from damage when the disc D is transported while being clamped by the guide member 3 and the roller 4. In a preferred embodiment, the metal plate 3A is made from a steel plate having subjected to a chromate treatment with a trivalent chrome and having a thickness of 1 mm, and the resin layer 3B is made from a fluorocarbon resin (ethylene-tetrafluoroethylene (ETFE) copolymer) film and having a thickness of 20 μm. Thus, the composite is obtained by previously bonding the fluorocarbon resin film to the steel plate. Since the ETFE copolymer film is in general unlikely bonded to another member, one surface of the ETFE copolymer film is subjected to a primer treatment; a primer and the film are chemically bonded by heat; and the primer and the steel are thermally deposited to each other so that the fluorocarbon resin film serving as the resin layer 3B is bonded to the steel plate serving as the metal plate 3A.

Each of right and left halves of the roller 4 has a trapezoidal cone shape gradually becoming larger in diameter from the central portion toward the end thereof, and the roller 4 is driven to rotate in either a normal direction or a reverse direction by a power from a motor (not shown). The roller 4 is rotatably supported at the rear portion of a roller bracket 5. The front portion of the roller bracket 5 is turnably supported by right and left latching plates 1b (see FIG. 3) formed by bending portions of the bottom surface of the chassis 1. Because both ends of the roller 4 are also engaged with corresponding cam grooves of the two slide members, which will be described later, when the two slide members move in the back-and-forth direction in synchronization with each other, the roller bracket 5 turns about its engaging portion with the latching plates 1b so as to activate the roller 4 to move up and down. With this structure, the disc D inserted through the slot 1d can be clamped by the lower surface of the guide member 3 and the roller 4. In this occasion, when the roller 4 is arranged such that the large-diameter portions thereof face the two recesses 3d of the guide member 3, the central portion of the disc D is reliably clamped by the guide member 3 and the roller 4.

As shown in FIGS. 2 and 3, the chassis 1 has a pair of detecting levers 6 turnably supported on the bottom surface thereof and also has a circuit board 7 (see FIGS. 11 to 13) fixed thereto and under the detecting levers 6. Each of the detecting levers 6 has a detecting pin 6a formed in a standing manner at the front thereof, and the upper end of the detecting pin 6a is inserted in an arch-shaped guide hole 2a perforated in the top chassis 2 (see FIG. 1). The detecting levers 6 are urged by a spring (not shown) in a direction in which the two detecting pins 6a come close to each other, and the detecting lever 6 lying at the left side in the drawing has a drive portion 6b disposed at the rear thereof. The circuit board 7 has a switch (not shown) mounted thereon. When the outer periphery of the disc D inserted through the slot 1d abuts against at least one of the detecting pins 6a and the corresponding detecting lever 6 accordingly turns outward by a predetermined angle, the foregoing switch is activated so as to start a drive motor for the foregoing roller 4 in accordance with the turning of this detecting lever 6.

The car-mounted disc display has a drive unit 8 disposed in the main body thereof, and the drive unit 8 has a drive chassis 9 formed by bending a metal plate. The drive chassis 9 is elastically supported on the bottom surface of the chassis 1 by elastic members such as a plurality of dampers 10 (see FIGS. 6 and 7) or coil springs (not shown). The drive chassis 9 has lock pins 9a and 9b disposed in a protruding manner at the left and right sides thereof, respectively, and also has a lock pin 9c and a lock pin (not shown) disposed in a protruding manner on the right side surface and the lower surface thereof, respectively. In addition, the drive chassis 9 has an optical pickup 11, a spindle motor 12, and so forth mounted thereon. The spindle motor 12 has a turntable 13 fixed to the rotating axis thereof (see FIG. 15). Furthermore, the drive chassis 9 has an arm clamp (clamper-supporting member) 14 disposed thereon. The arm clamp 14 is supported so as to be vertically translated since a pair of guide grooves 14a formed on the right and left side surfaces thereof are respectively engaged with the lock pins 9a and 9c of the drive chassis 9. The arm clamp 14 has a projecting piece (not shown) integrally formed by bending a portion of the left side surface thereof and also has a pair of front and rear drive pins 14b disposed on the right side thereof in a protruding manner. In addition, the arm clamp 14 has a clamper 15 rotatably supported thereon, and the pair of drive pins 14b of the arm clamp 14 are inserted in a pair of corresponding cam holes 16b of a drive arm 16 (see FIG. 16). The drive arm 16 is supported at the right end of the drive chassis 9 so as to be slidable in the back-and-forth direction and is elastically urged by a spring 17 toward the slot 1d. Also, the drive arm 16 has an engaging projection 16a which engageably faces a projection of the right slide member, which will be described later.

Figure 14:
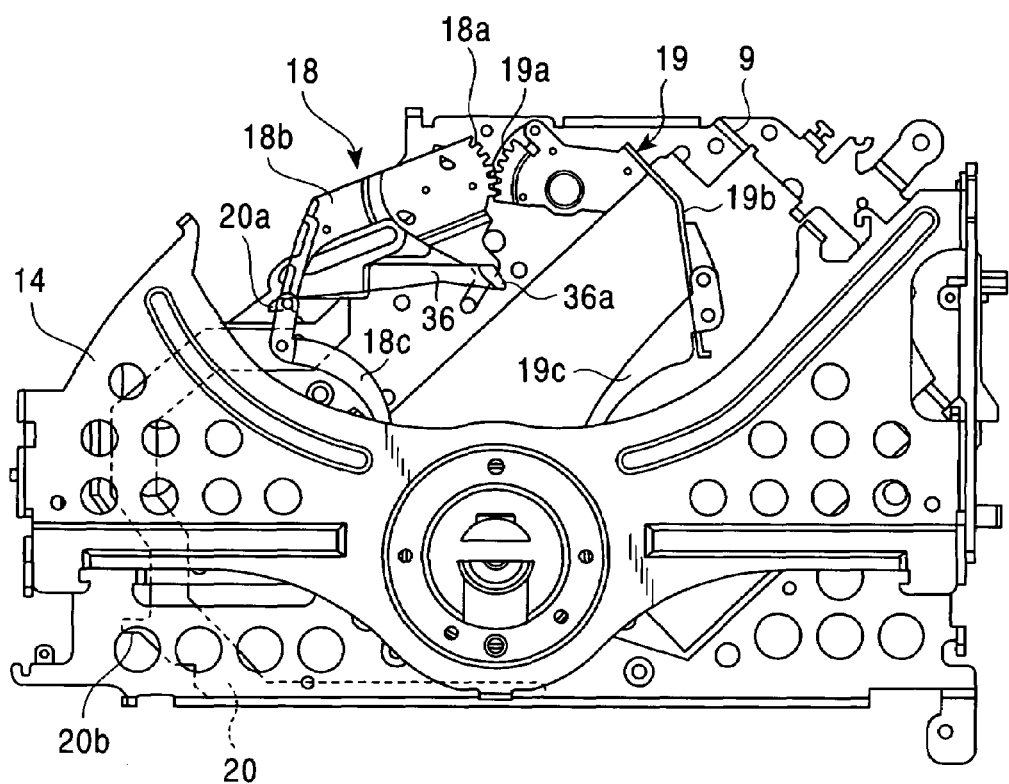
FIG. 14 is a plan view of a disc-positioning mechanism provided in the disc player.
Figure 15:
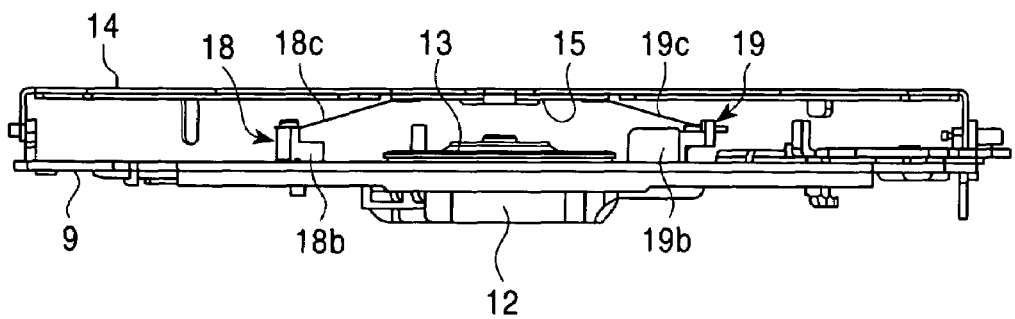
FIG. 15 is a front view of the disc-positioning mechanism.
Figure 16:
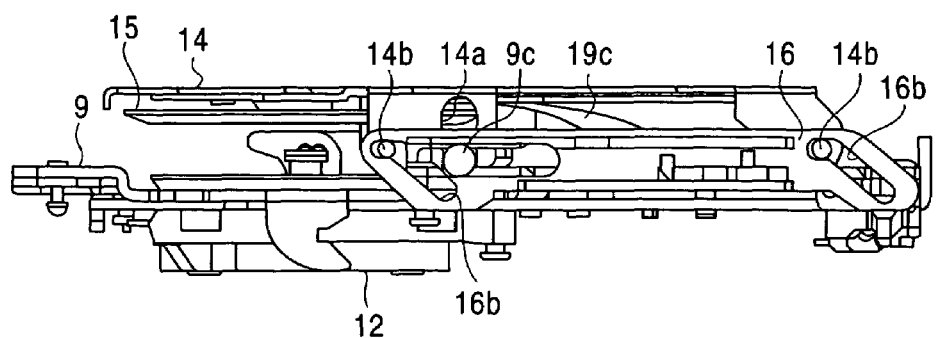
FIG. 16 is a right side view of the disc-positioning mechanism.

As shown in FIGS. 14 to 16, the drive chassis 9 has a pair of positioning members 18 and 19 turnably supported thereon. The positioning members 18 and 19 respectively position the center holes of the discs SD and LD, having different diameters from each other, with respect to the turntable 13. The left positioning member 18 is formed by an arm lever (an abutment) 18b, made from a synthetic resin and having a toothed portion 18a at the rear thereof, and by a regulating arm (a regulatory portion) 18c made from a leaf spring. The regulating arm 18c is cantilevered such that its base portion is fixed to the front of the arm lever 18b and its free end elastically abuts against the lower surface of the arm clamp 14. The right positioning member 19 is formed by an arm lever (an abutment) 19b, made from a metal plate and having a toothed portion 19a at the rear thereof, and by a regulating arm (a regulatory portion) 19c made from a leaf spring. The regulating arm 19c is cantilevered such that its base portion is fixed to the front of the arm lever 19b and its free end also elastically abuts against the lower surface of the arm clamp 14. The two positioning members 18 and 19 turn in synchronization with each other by arranging the corresponding toothed portions 18a and 19a to engage with each other and are urged by a spring (not shown) in a direction in which the fronts thereof come closer to each other.

Also, the drive chassis 9 has a first-end detecting lever 36 turnably supported thereon and a lock lever 20 supported thereon so as to be horizontally movable. The first-end detecting lever 36 has a detecting portion 36a contactable with the outer periphery of the disc SD having a diameter of 8 cm. The detecting portion 36a lies at the center between the two arm levers 18b and 19b. The arm lever 18b of the positioning member 18 and the first-end detecting lever 36 are connected to each other via a pin and a long hole (both not shown) such that the first-end detecting lever 36 turns toward the remotest side of the drive chassis 9 in conjunction with the outward turning of the left positioning member 18. In addition, the first-end detecting lever 36 has a relay member (not shown) connected to the end thereof lying on the other side of the detecting portion 36a so that the turning of the first-end detecting lever 36 is selectively transmitted to a second-end detecting lever, which will be described later, via the relay member. The lock lever 20 has a lock portion 20a formed at the rear thereof, which is engageable with the arm lever 18b of the left positioning member 18, and is urged by a spring (not shown) to the left of the drive chassis 9. The lock lever 20 has a pressing portion 20b disposed at the front thereof so as to face the drive portion 6b of the foregoing left detecting lever 6. When the disc LD having a diameter of 12 cm is inserted into the disc player, the drive portion 6b presses the pressing portion 20b so that the lock lever 20 is moved rightward in order to remove the restriction of the positioning member 18 caused by the foregoing lock portion 20a.

The foregoing two slide members are disposed on the inner surfaces of right and left side surfaces 1a of the chassis 1. Hereinafter, the left and right slide members are respectively referred to as a first slide member 21 and a second slide member 22. The two slide members 21 and 22 are composed of a synthetic resin and are supported on the chassis 1 so as to be movable in the back-and-forth direction.

Figure 6:
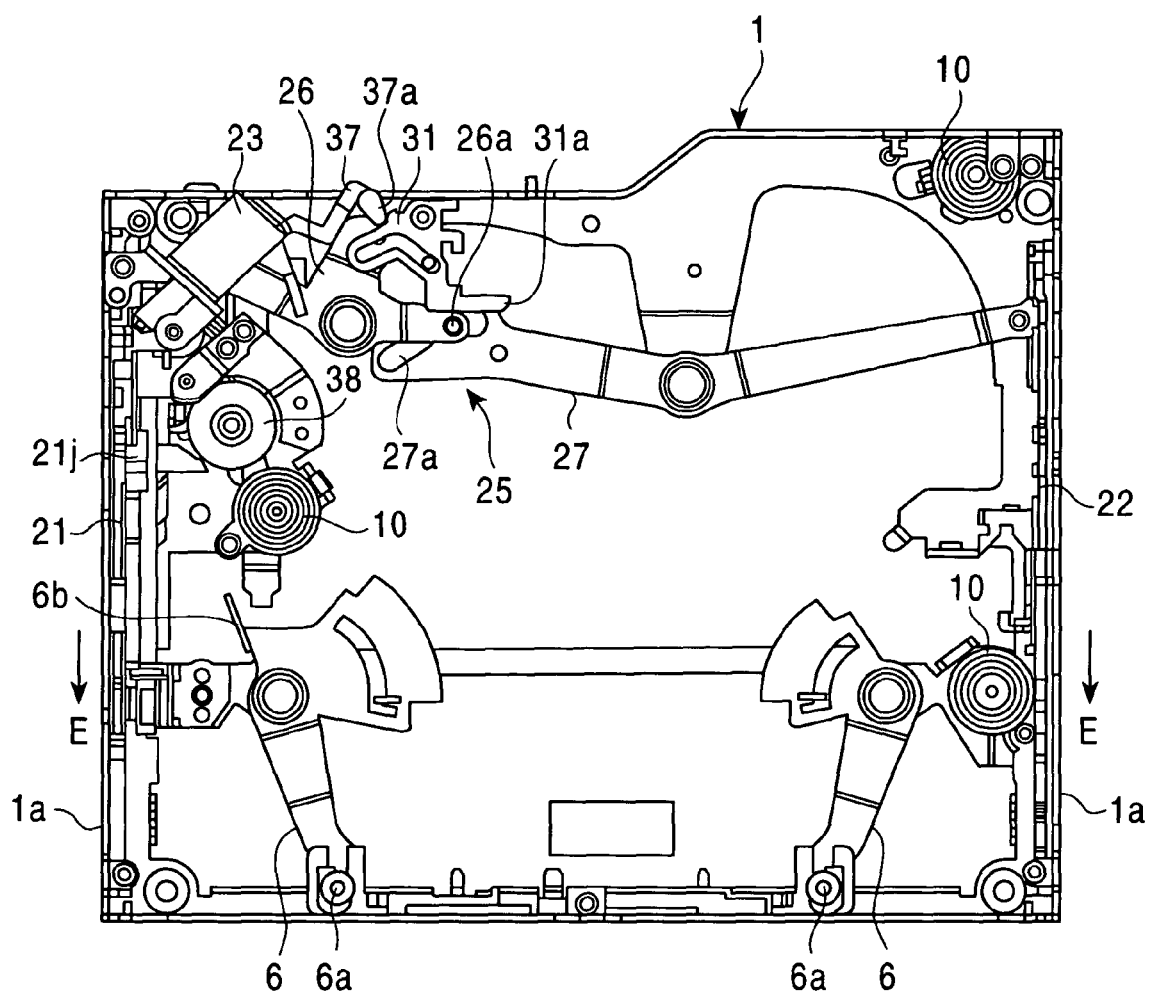
FIG. 6 is a plan view of the link mechanism in an ejected state.
Figure 7:
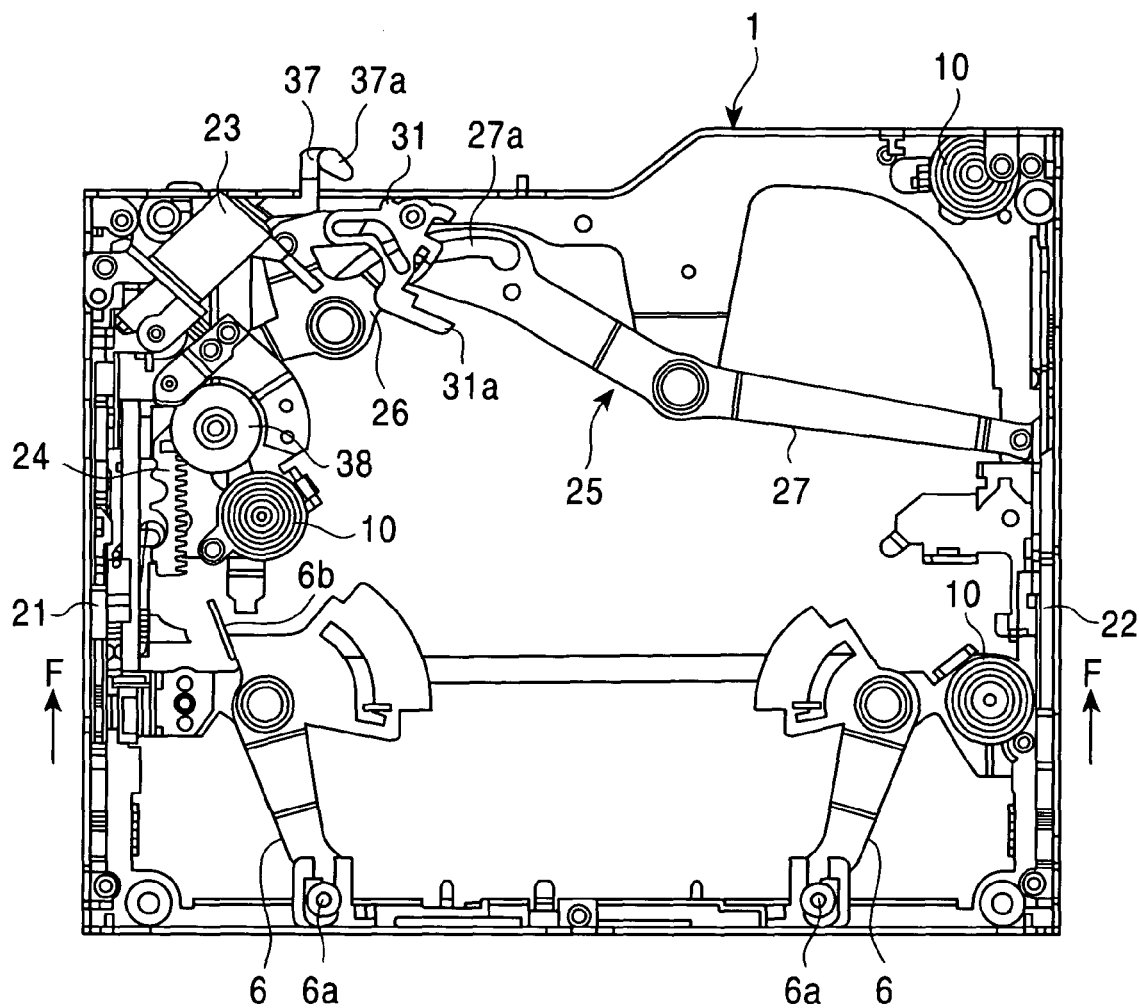
FIG. 7 is a plan view of the link mechanism during play.

As shown in FIGS. 6 and 7, the chassis 1 has a second-end detecting lever 37 and a motor 23 serving as a drive source for the first slide member 21 turnably supported and disposed, respectively, at the left remote end of the bottom surface thereof. The second-end detecting lever 37 has a detecting portion 37a contactable to the outer periphery of the disc LD having a diameter of 12 cm and is urged clockwise by a spring (not shown). The power of the motor 23 is transmitted to a gear 38 lying at the final stage of a gear train via the gear train. The left first slide member 21 has a rack 24 facing the gear 38 and supported on the bottom plate thereof so as to be movable in the back-and-forth direction by a predetermined distance. Although the rack 24 is urged backward by a spring (not shown) so as to move away from the gear 38, when the second-end detecting lever 37 turns counterclockwise and is pressed forward by the end of the second-end detecting lever 37 on the other side of the detecting portion 37a, the rack 38 engages with the gear 38. Thus, when the rack 24 is moved forward by a predetermined distance by the power of the motor 23, the moving force of the rack 24 is transmitted to the first slide member 21, and thus a rack portion 21h formed on the bottom plate of the first slide member 21 engages with the gear 38. With this structure, the power of the motor 23 is transmitted to the left first slide member 21 via the gear 38, and the movement of the first slide member 21 is transmitted to the right second slide member 22 via a link mechanism 25.

Figure 5:
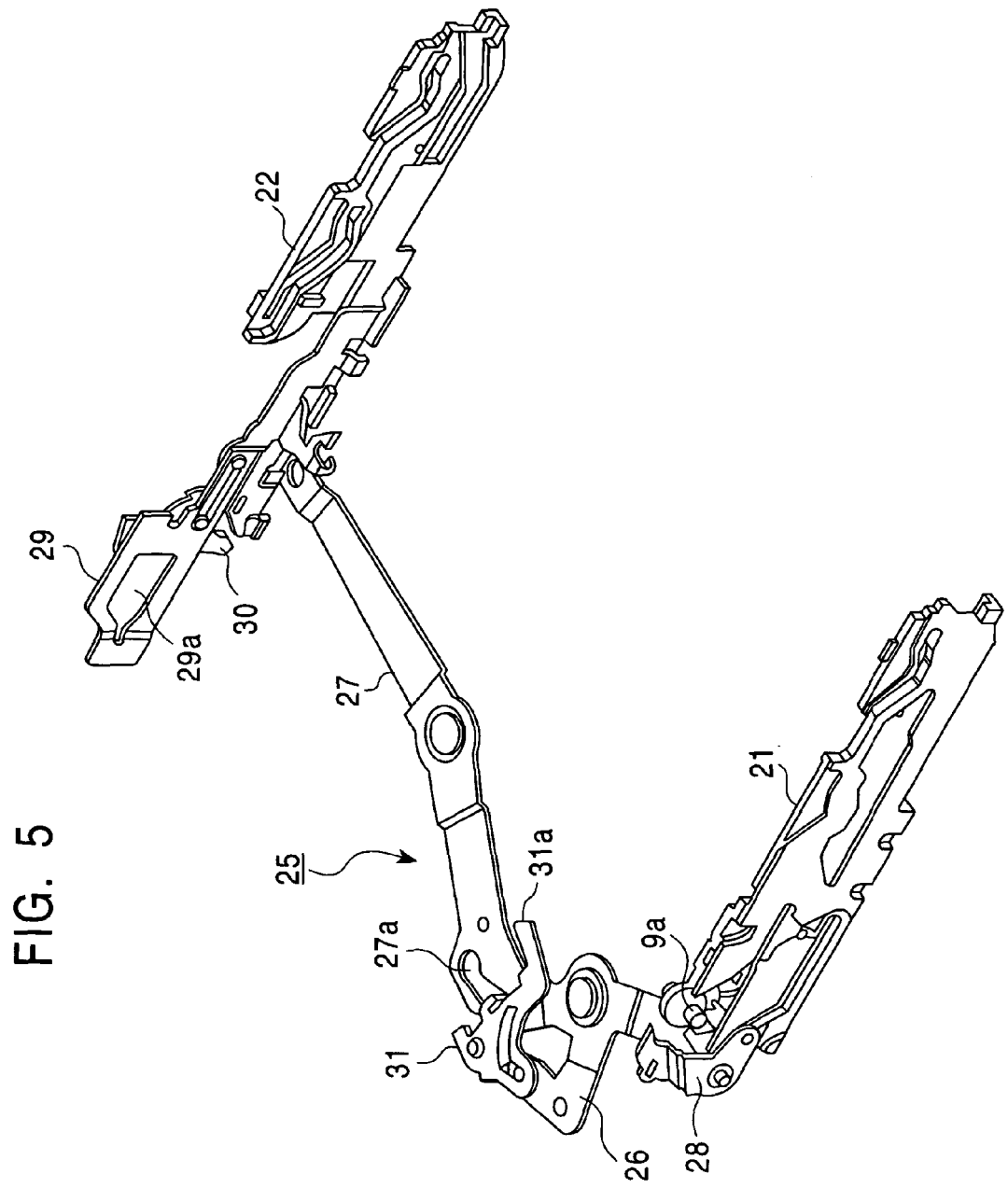
FIG. 5 is a perspective view of a link mechanism, the slide members, and so forth provided in the disc player.

As shown in FIG. 5, the link mechanism 25 is formed by first and second link levers 26 and 27, which are turnably supported on the bottom surface of the chassis 1. The left end of the first link lever 26 is turnably connected to the rear end of the first slide member 21; the right end of the second link lever 27 is turnably connected to the rear end of the second slide member 22; and a pin 26a implanted in the right end of the first link lever 26 is inserted in a cam hole 27a perforated in the left end of the second link lever 27. Accordingly, when the first link lever 26 turns in accordance with the back and forth movement of the first slide member 21, the pin 26a moves within the cam hole 27a so as to cause the second link lever 27 to turn, thereby allowing the second slide member 22 to move back and forth in the same direction as the first slide member 21. That is, the first slide member 21 is a driver powered by the motor 23, and the second slide member 22 is an idler movable in synchronization with the first slide member 21.

The chassis 1 has a lock lever 28 turnably supported on the inner surface of the left side plate 1a. Since the lock lever 28 turns as the first slide member 21 moves back and forth, in accordance with this movement, the lock pin 9a disposed at the left of the drive chassis 9 is engaged or disengaged. Meanwhile, the chassis 1 has a lock slide member 29 and a link arm 30 supported on the inner surface of the right side plate 1a thereof so as to be movable in the back-and-forth direction and to be turnable, respectively. Since the link arm 30 turns as the second slide member 22 moves back and forth, in accordance with this movement, the lock slide member 29 moves back and forth in the opposite direction to the second slide member 22. The lock slide member 29 has a lock hole 29a perforated therein, which engages with or disengaged from the lock pin 9b disposed at the right of the drive chassis 9. Also, the chassis 1 has a center lock lever 31 having a lock arm 31a turnably supported on the bottom surface thereof. Because the center lock lever 31 turns in conjunction with the first link lever 26, a lock pin (not shown) disposed at the central portion of the lower surface of the drive chassis 9 is engaged or disengaged in accordance with this movement.

As shown in FIGS. 8 to 13, the left first slide member 21 has a plurality of cam grooves 21a to 21e formed on the inner surface thereof and also has first and second drive portions 21f and 21g integrally formed on the inner bottom thereof. The first slide member 21 has a cam-shaped pressing piece 21j formed on the inner surface thereof. Since the pressing piece 21j lies at a position in which it can get under the foregoing projecting piece integrally formed with the arm clamp 14, when the pressing piece 21j gets under the projection piece, the arm clamp 14 is moved up.

The foregoing circuit board 7 has first and second detecting switches 32 and 33 mounted thereon. The first detecting switch 32 has an actuator portion 32a protruding out from the left side surface of the circuit board 7 and the second detecting switch 33 has an actuator portion 33a protruding upward from the circuit board 7. The first detecting switch 32 is activated when the first drive portion 21f presses the actuator portion 32a during the forward movement of the first slide member 21. Thus, the first drive portion 21f and the first detecting switch 32 serve as position-detecting means that can detect a half-locked position, which will be described later. The second detecting switch 33 is activated when the second drive portion 21g presses the actuator portion 32a during the forward movement of the first slide member 21, and thus the second drive portion 21g and the second detecting switch 33 serve as road-end detecting means. The right second slide member 22 also has a plurality of cam grooves 22a to 22c formed on the inner surface thereof and has a protrusion 22d formed on the upper surface thereof. FIGS. 8A to 10A illustrate the first slide member 21 and FIGS. 8B to 10B illustrate the second slide member 22, both viewed from the inside of the main body of the disc player.

Both ends of the roller 4 engage with the cam grooves 21a and 22a of the two slide members 21 and 22, and left two and right two of the four drive pins 3c of the guide member 3 engage with the cam grooves 21b and 21c of the slide member 21 and the cam grooves 22b and 22c of the slide member 22, respectively. The left lock pin 9a of the drive chassis 9 engages with the cam groove 21d of the first slide member 21, and a pin 28a implanted in the lock lever 28 engages with the cam groove 21e of the first slide member 21. In addition, the engaging projection 16a of the drive arm 16 engageably faces the protrusion 22d of the second slide member 22, and the pair of drive pins 14b of the arm clamp 14 are inserted in the pair of cam holes 16b. Also, the right lock pin 9b of the drive chassis 9 engages with the lock hole 29a of the lock slide member 29 that moves in the opposite direction to the second slide member 22 via the link arm 30. With this structure, when the first and second slide members 21 and 22 move back and forth in the same direction, in accordance with this movement, the roller 4 and the guide member 3 move up and down; the drive chassis 9 is locked and unlocked; and the arm clamp 14 moves up and down.

As described above, in a preferred embodiment, the pair of drive pins 14b and the projecting piece of the arm clamp 14, the pressing piece 21j of the first slide member 21, and the drive arm 16 form a clamp mechanism for clamping and unclamping the disc D between the clamper 15 and the turntable 13 by activating the arm clamp 14 to move in an up-and-down direction along which the arm clamp 14 moves toward and away from the drive chassis 9. Also, the lock pins 9a and 9b of the chassis 9 and the lock pin on the lower surface of the same, the cam groove 21d of the first slide member 21, the lock lever 28, the lock slide member 29, the link arm 30, and the center lock lever 31 form a lock mechanism that locks or unlocks the drive unit 8 to or from the chassis 1. In addition, the first and second slide members 21 and 22 and the link mechanism 25 form a change-over mechanism for activating the foregoing clamp mechanism and lock mechanism to perform the respective change-over operations.

As shown in FIG. 3, the chassis 1 has a positioning hole 34 perforated in the left side plate 1a thereof, and the first slide member 21 has a positioning hole or depression (not shown) formed therein which is similar to the positioning hole 34. By inserting a temporal fixing pin 35 in and latching it with the positioning hole 34 or the positioning depression from the outside of the left side plate 1a of the chassis 1, the first slide member 21 is prevented from moving at a half-locked position, which will be described later, with respect to the chassis 1. Alternatively, when the positioning depression of the first slide member 21 and the temporal fixing pin 35 are formed as a screw hole and a male screw, respectively, the first slide member 21 may be firmly fixed by screwing the temporary pin into the positioning depression.

Figure 8A:
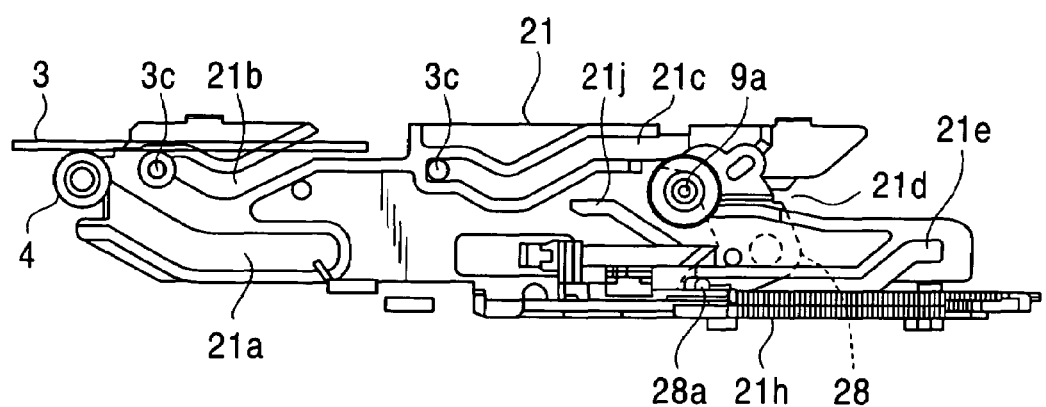
FIGS. 8A and 8B respectively illustrate the first and second slide members provided in the disc player, both lying at an ejected position.
Figure 8B:
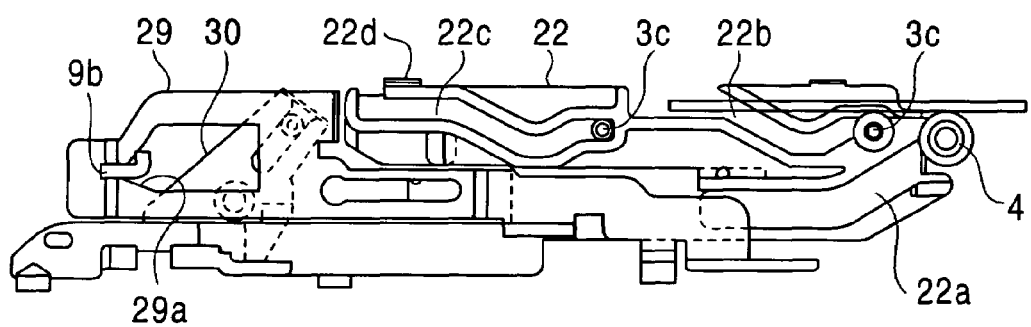

During ejection (in a standby state) where the disc player has no disc D (small disc SD or large LD) inserted in the main body thereof, the first and second slide members 21 and 22 remain at a retreat position on the remotest side of the chassis 1. As shown in FIGS. 8A and 8B, during the above-mentioned ejection, both ends of the roller 4 lie at corresponding upper positions and on the near side of the cam grooves 21a and 22a, and the drive pins 3c of the guide member 3 lie at corresponding middle positions and on the near side of the cam grooves 21b, 22b, 21c, and 22c. With this arrangement, the guide member 3 is held at a descent position corresponding to the slot 1d, and the roller 4 is held at an ascent position in which the roller 4 is pressed against the lower surface of the guide member 3. The left lock pin 9a of the drive chassis 9 is restrained by the cam groove 21d of the first slide member 21 and the lock lever 28 from the rear and front directions; the right lock pin 9b of the same is latched with the inner periphery of the lock hole 29a of the lock slide member 29; and also, the lock pin (not shown) on the lower surface of the drive chassis 9 is latched with the lock arm 31a of the center lock lever 31. As a result, the drive unit 8 remains in a locked state of being fixedly supported on the chassis 1 in the back-and-forth direction as well as in the horizontal and vertical directions. In addition, since the engaging projection 16a of the drive arm 16 is pressed against the protrusion 22d of the second slide member 22 and thus the drive arm 16 also remains at its retreat position, as shown in FIG. 16, the two drive pins 14b of the arm clamp 14 move up along the corresponding two cam holes 16b of the drive arm 16. Also, because the pressing piece 21j of the first slide member 21 gets under the projecting piece of the arm clamp 14 and lifts this projecting piece upwards, the arm clamp 14 is held in an ascend position in which it detaches from the drive chassis 9. With this arrangement, as shown in FIG. 15, the clamper 15 lies right above the turntable 13 so as to provide a space in which the disc D is inserted. In this stage, the regulating arms 18c and 19c of the two positioning members 18 and 19 respectively extend from the arm levers 18b and 19b toward the clamper 15 and elastically abut against the lower surface of the arm clamp 14, and the lock portion 20a of the lock lever 20 is latched with the arm lever 18b so as to restrain the turning of the positioning member 18.

In such a standby state, when the disc D (small disc SD or large disc LD) starts to be inserted into the main body of the disc player from the approximate center of the slot 1d, the outer periphery of the front side of the disc D in the inserting direction thereof comes into contact with the detecting pins 6a of the two detecting levers 6, and the insertion force of the disc D causes the two detecting levers 6 to turn outward. When a switch (not shown) detects the fact that at least one of the detecting levers 6 turns by a predetermined angle, a motor (not shown) starts to rotate the roller 4. When the disc D is further inserted, the front portion of the disc D in the insertion direction is clamped by the lower surface of the guide member 3 and the roller 4, and the rotation force of the roller 4 causes the disc D to be transferred in the main body of the disc player. Because the drive chassis 9 is maintained in a locked state and the arm clamp 14 is held at a standby position above the drive chassis 9, the drive chassis 9 and the arm clamp 14 (in other words, the turntable 13 and the clamper 15) have a transfer route for the disc D inserted therebetween. When the disc D is detected by the above-mentioned switch detects the fact that the disc D is inserted, the motor 23 disposed at the left remote end on the chassis 1 starts to rotate.

Figure 17:
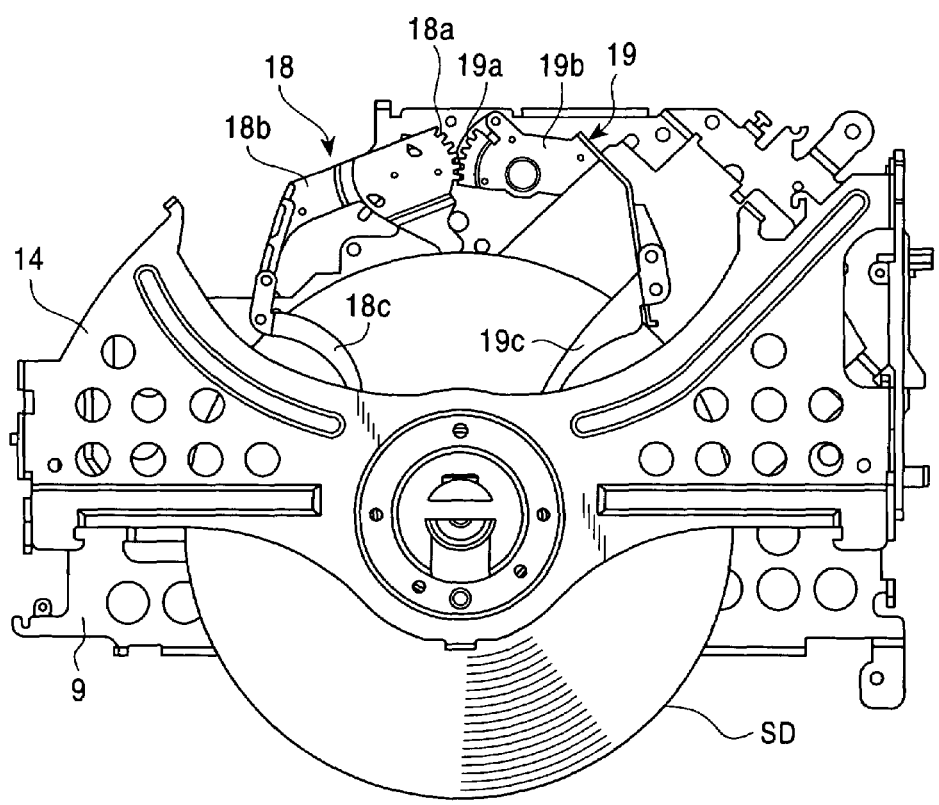
FIG. 17 is a plan view of the disc-positioning mechanism illustrating a state in which a small disc is loaded.
Figure 18:
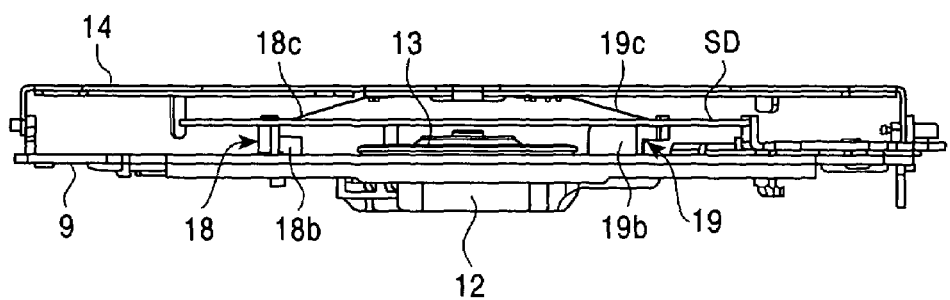
FIG. 18 is a front view of the disc-positioning mechanism illustrating a state in which the small disc is loaded.

When the inserted disc D is a small disc SD having a diameter of 8 cm, since the outward turning of the two detecting levers 6 forms a small angle, the pressing portion 20b of the lock lever 20 does not come into contact with the drive portion 6b of the left detecting lever 6 during the transfer of the disc SD, and the two positioning members 18 and 19 remain in a lock state of being restrained at a predetermined open angle (at a first position). When the disc SD is inserted from the left side of the slot 1d, although the drive portion 6b of the left detecting lever 6 causes the lock lever 20 to slide rightward once, since the detecting levers 6 return to their original states while the disc SD is moving toward the remote side, upon transfer of the disc SD to a position in which the center hole of the disc SD lies right above the turntable 13, the two positioning members 18 and 19 return to the lock state. With this arrangement, when the disc SD passes through the space between the drive chassis 9 and the arm clamp 14 and is transferred to the remote side of the chassis 1, as shown in FIGS. 17 and 18, two points of the outer periphery of the front side of the disc SD in the transfer direction come into contact with the fronts of the two arm levers 18b and 19b, and thus the center hole of the disc SD is properly positioned with respect to the turntable 13. In this case, because the regulating arms 18c and 19c of the two positioning members 18 and 19 respectively extend from the fronts of the arm levers 18b and 19b and elastically abut against the lower surface of the arm clamp 14, even when an external vibration or shock is exerted on the disc player, the disc SD during transfer does not pass over above the two arm levers 18b and 19b and is reliably positioned by the two positioning members 18 and 19 while being guided by the regulating arms 18c and 19c.

When the disc SD is positioned with respect to the turntable 13 as mentioned above, because the front of the disc SD comes into contact with the detecting portion 36*a* and the first-end detecting lever 36 turns counterclockwise, the second-end detecting lever 37 also turns counterclockwise via the relay member (not shown) so as to engage the rack 24 with the gear 38. Subsequently, when the rack 24 moves on the bottom plate of the first slide member 21 up to a position where the rack 24 is limited to move, the rack 24 and the first slide member 21 are actually integrated, whereby the first slide member 21 starts to move forward and the rack portion 21*h* engages with the gear 38. As a result, the rotating power of the motor 23 is transmitted to the left first slide member 21 via the gear 38; the movement of the first slide member 21 is transmitted to the right second slide member 22 via the link mechanism 25; and the first and second slide members 21 and 22 start to move from the retreat position on the remotest side of the chassis 1 to an advance position thereof. In addition, upon the disc SD being positioned with respect to the turntable 13, because the two detecting levers 6 detach from the disc SD and return to their original positions, the foregoing switch detects this movement and stops the roller 4 to rotate. Alternatively, the rotation of the roller 4 may be stopped by detecting the turning of the second-end detecting lever 37 with a switch (not shown).

Figure 19:
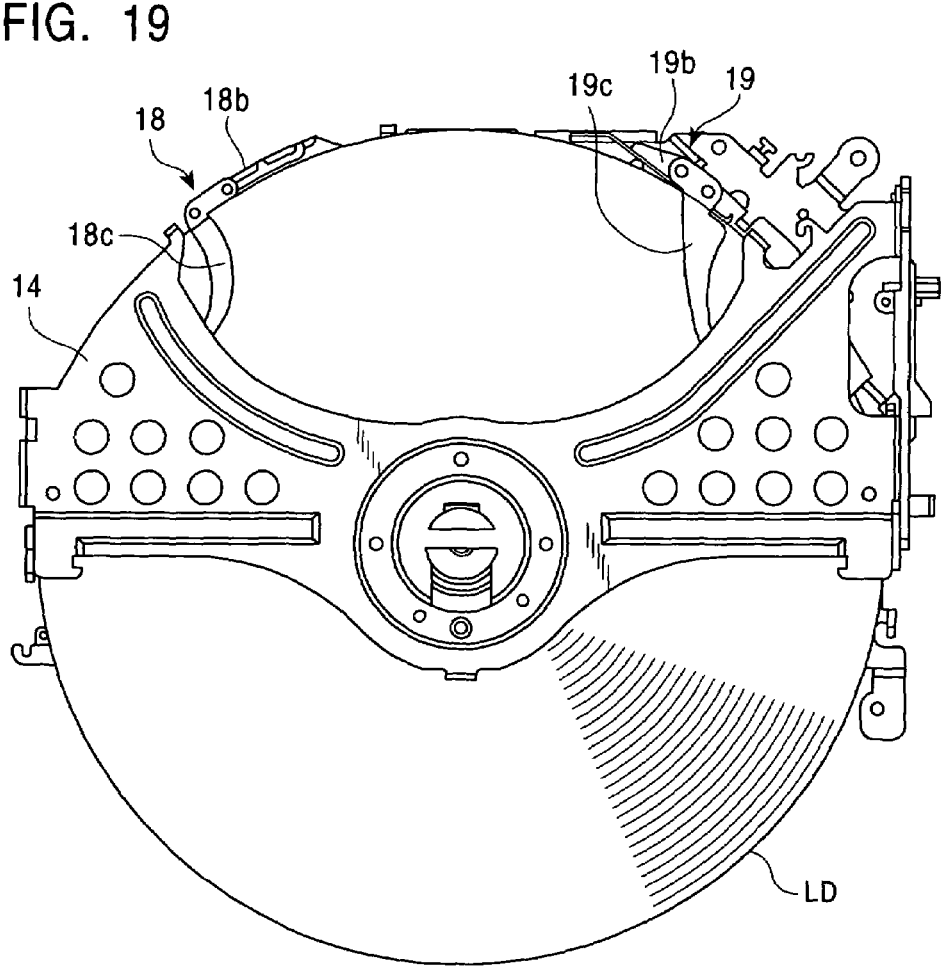
FIG. 19 is a plan view of the disc-positioning mechanism illustrating a state in which a large disc is loaded.
Figure 20:
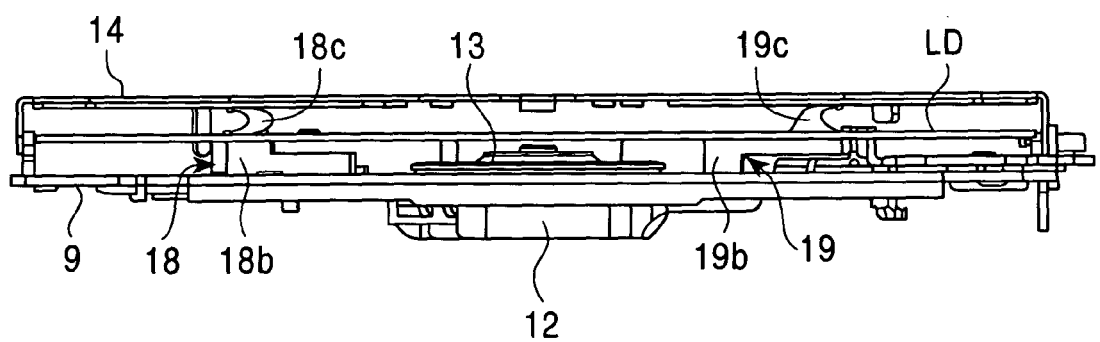
FIG. 20 is a front view of the disc-positioning mechanism illustrating a state in which the large disc is loaded.
Figure 21A:
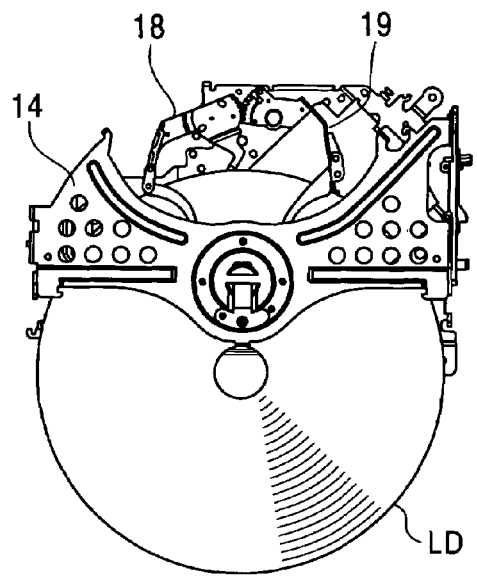
FIGS. 21A to 21D are plan views of the disc-positioning mechanism illustrating an operation of positioning the large disc.
Figure 21C:
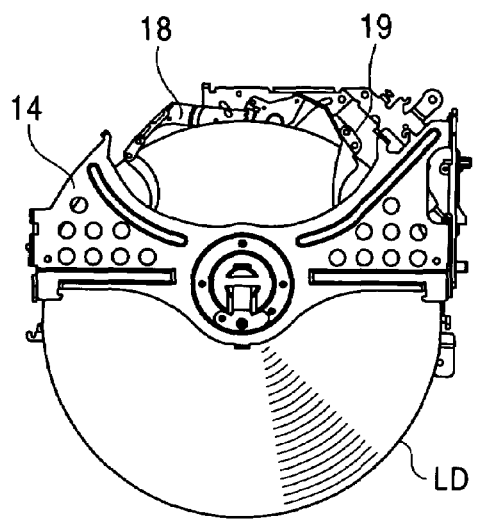
Figure 21B:
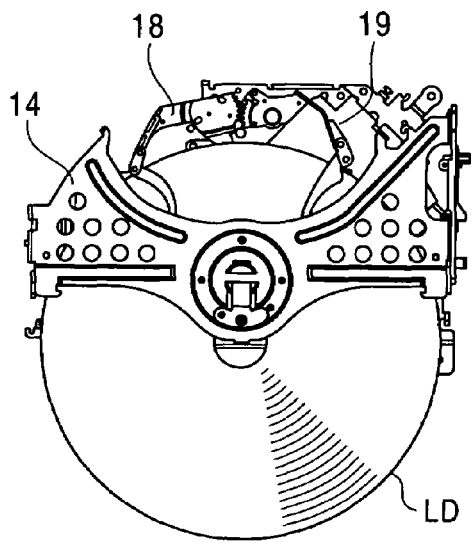
Figure 21D:
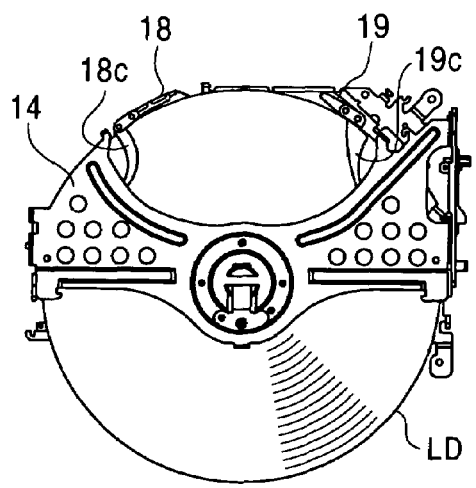

Meanwhile, when the inserted disc D is a large disc LD having a diameter of 12 cm, because the outward turning of the two detecting levers 6 forms a wider angle than in the case of the disc SD, during the transfer of the disc LD, the pressing portion 20*b* of the lock lever 20 is pressed by the drive portion 6*b* of the left detecting lever 6 and thus the lock lever 20 moves rightward. As a result, the two positioning members 18 and 19 are released from the restriction of the lock portion 20*a* of the lock lever 20. With this arrangement, when the disc LD passes through the space between the drive chassis 9 and the arm clamp 14 and is transferred to the remote side of the chassis 1, as shown in FIGS. 21A and 21D, two points of the outer periphery of the front side of the disc LD in the transfer direction come into contact with the fronts of the two arm levers 18*b* and 19*b*, and then the transfer force of the disc LS causes the two positioning members 18 and 19 to turn outwards so as to widen an angle formed between these members. In accordance with this movement, the two regulating arms 18*c* and 19*c* slide on the lower surface of the arm clamp 14. When the two positioning members 18 and 19 is stopped at a predetermined open angle (at a second position) by a stopper (not shown), as shown in FIGS. 19, 20, and 21D, the outer periphery of the disc LD abuts against the inner circumferential surface of the two arm levers 18*b* and 19*b*. As a result, the center hole of the disc LD is properly positioned with respect to the turntable 13. Also, in this case, since the regulating arms 18*c* and 19*c* of the two positioning members 18 and 19 respectively extend from the fronts of the arm levers 18*b* and 19*b* and elastically abut against the lower surface of the arm clamp 14, even when an external vibration or shock is exerted on the disc player, the front side of the disc LD in the transfer direction is guided by the regulating arms 18*c* and 19*c*, whereby the disc LD during transfer does not pass over above the two arm levers 18*b* and 19*b* and is accordingly reliably positioned by the two positioning members 18 and 19.

As stated previously, because the first-end detecting lever 36 and the arm lever 18*b* of the positioning member 18 are connected to each other via the pin and the long hole (both not shown), although the first-end detecting lever 36 turns such that the detecting portion 36*a* thereof detaches from the disc LD in conjunction with the positioning member 18, the rotation force of the first-end detecting lever 36 is cut off by the relay member so as not to be transmitted to the second-end detecting lever 37. When the disc LD is positioned with respect to the turntable 13, the outer periphery of the disc LD during transfer comes into contact with the detecting portion 37*a* so as to turn the second-end detecting lever 37, whereby the rack 24 is pressed by the second-end detecting lever 37 and thus engages with the gear 38. Then, in the similar fashion to the foregoing small disc SD, the rotating power of the motor 23 is transmitted to the left first slide member 21 via the gear 38, and the first and second slide members 21 and 22 start to move from the retreat position on the remotest side of the chassis 1 to the advance position. When the disc LD is positioned with respect to the turntable 13, the rotation of the roller 4 is stopped.

When the disc D (small disc SD or large LD) is positioned with respect to the turntable 13 as described above and then the rotating power of the motor 23 is transmitted to the left first slide member 21, because the movement of the first slide member 21 is transmitted to the second slide member 22 via the link mechanism 25 formed by the first link lever 26 and the second link lever 27, as stated previously, the left and right slide members 21 and 22 move from the retreat position to the advance position in the direction indicated by the arrow E in FIG. 6 in synchronization with each other without generating a substantial phase lag.

Figure 9A:
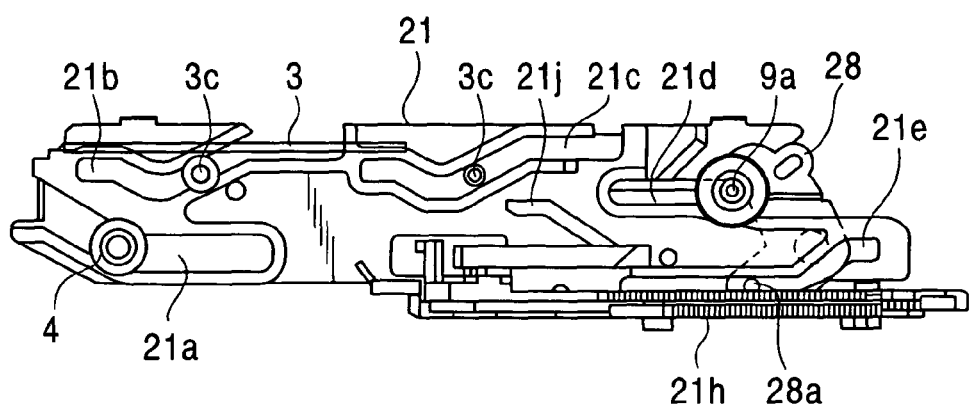
FIGS. 9A and 9B respectively illustrate the first and second slide members lying at a half-locked position.
Figure 9B:
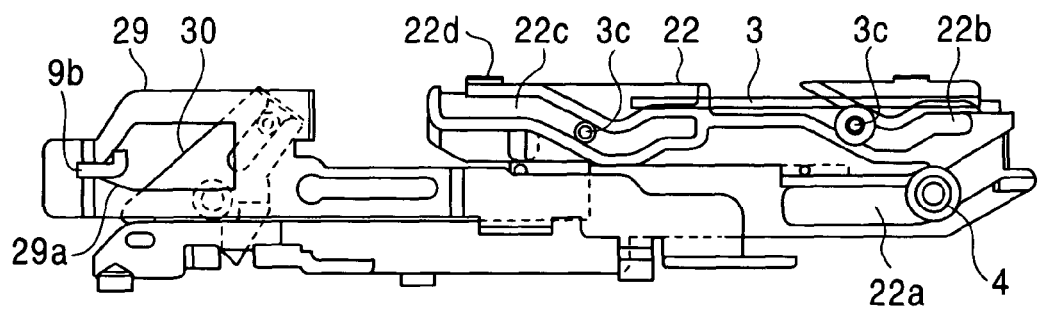

While the first and second slide members 21 and 22 are moving from the retreat position shown in FIGS. 8A and 8B to a position shown in FIGS. 9A and 9B, both ends of the roller 4 move from the corresponding upper positions to lower positions of the cam grooves 21*a* and 22*a*, and the drive pins 3*c* of the guide member 3 move from the corresponding middle positions to lower positions of the cam grooves 21*b*, 22*b*, 21*c*, and 22*c* and then to corresponding middle positions of sloped portions of the same. As a result, the guide member 3 moves down from the foregoing descent position to its lowest position and then moves up so as to return to the lower position, and the roller 4 moves to its descent position and thus detaches from the lower surface of the disc D. Although the lock pin 9*a* moves within the cam groove 21*d*, since the pin 28*a* of the lock lever 28 moves in a horizontal portion of the cam groove 21*e*, the lock pin 9*a* remains in being latched with the lock lever 28. Likewise, since the second slide member 22 moves in a range so as not to affect the attitude of the link arm 30, the lock slide member 29 remains at rest; accordingly, the lock pin 9*b* is also latched with the lock hole 29*a* of the lock slide member 29, and the lock pin (not shown) on the lower surface of the drive chassis 9 remains in being latched with the lock arm 31*a* of the center lock lever 31, whereby the drive unit 8 remains in a locked state of being fixedly supported on the chassis 1. Meantime, when the protrusion 22*d* of the second slide member 22 moves forward, the drive arm 16 moves forward by a predetermined distance urged by the spring 17, while the engaging projection 16*a* of the drive arm 16 remains in contact with the protrusion 22*d*. Thus, the pair of drive pins 14*b* of the arm clamp 14 moves down along the corresponding cam holes 16*b* of the drive arm 16. At the same time, when the first slide member 21 moves forward, the pressing piece 21*j* detaches from the projecting piece of the arm clamp 14, thereby causing the arm clamp 14 to move down so as to come closer to the drive chassis 9. As a result, the clamper 15 supported by the arm clamp 14 comes close to the turntable 13, and the periphery of the center hole of the disc D is chucked between the turntable 13 and the clamper 15. While the disc D is being placed on the turntable 13 from its transfer height, the guide member 3 also moves down together with the clamper 15 due to the cam shapes of the cam grooves 21*b* and 21*c* and the cam grooves 22*b* and 22*c* of the slide members 21 and 22, respectively, while the guide member 3 remains in contact with the upper surface of the disc D, whereby the disc D positioned by the two positioning members 18 and 19 is reliably chucked between the turntable 13 and the clamper 15. Also, since the regulating arms 18*c* and 19*c* of the corresponding positioning members 18 and 19 are deformed due to their own elasticity while elastically abutting against the lower surface of the descending arm clamp 14, the arm clamp 14 is not prevented by the regulating arms 18*c* and 19*c* from moving up and down.

As is obvious from the above description, when the first and second slide members 21 and 22 move to the position shown in FIGS. 9A and 9B, the drive unit 8 remains in the locked state of being fixedly locked to the chassis 1 while the disc D is being chucked (clamped) between the turntable 13 and the clamper 15. In the following description, this position will be referred to as a half-locked position.

Figure 10A:
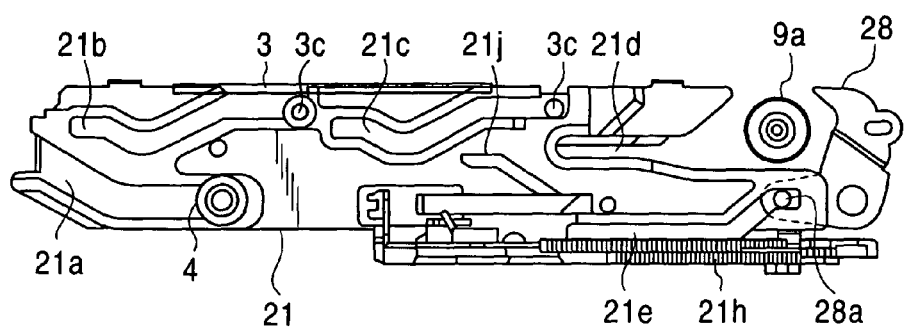
FIGS. 10A and 10B respectively illustrate the first and second slide members lying at a playing position.
Figure 10B:
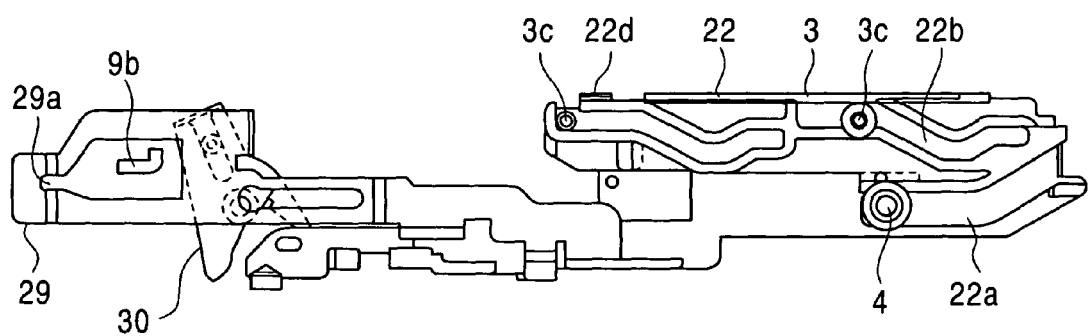

While the first and second slide members 21 and 22 are moving from the half-locked position shown in FIGS. 9A and 9B to the advance position on the nearest side of the chassis 1 shown in FIGS. 10A and 10B, the two ends of the roller 4 moves to the lower positions on the remote sides of the cam grooves 21*a* and 22*a*, and the drive pins 3*c* of the guide member 3 move from the corresponding middle positions of the sloped portions of the cam grooves 21*b*, 22*b*, 21*c*, and 22*c* to the corresponding upper positions of the same. As a result, the guide member 3 moves from the descent position to the ascend position and detaches further from the upper surface of the disc D, and also the roller 4 is held at the descend position away from the lower surface of the disc D, thereby providing a large space, in which the disc D is not prevented from rotation, between the guide member 3 and the roller 4. Also, the lock pin 9*a* moves to a position at which it disengages from the cam groove 21*d*, and the pin 28*a* moves from the horizontal portion of the cam groove 21*e* to a sloped portion of the same so as to turn the lock lever 28, whereby the latching of the lock pin 9*a* with the lock lever 28 is released. In addition, since the link arm 30 turns such that as the second slide member 22 moves from the position shown in FIG. 9B to the position shown in FIG. 10B, the lock slide member 29 moves to the remote side of the chassis 1, the latching of the lock pin 9*b* with the lock slide member 29 is released, and since the center lock lever 31 turns to a large extent in conjunction with the first link lever 26 (see FIG. 7), the latching of the lock pin on the lower surface of the chassis 9 with the center lock lever 31 is also released at the same time. As a result, the drive chassis 9 is elastically supported on the chassis 1 by the dampers 10 or the like and the drive unit 8 is changed over from the locked state to the unlock state.

Figure 11:
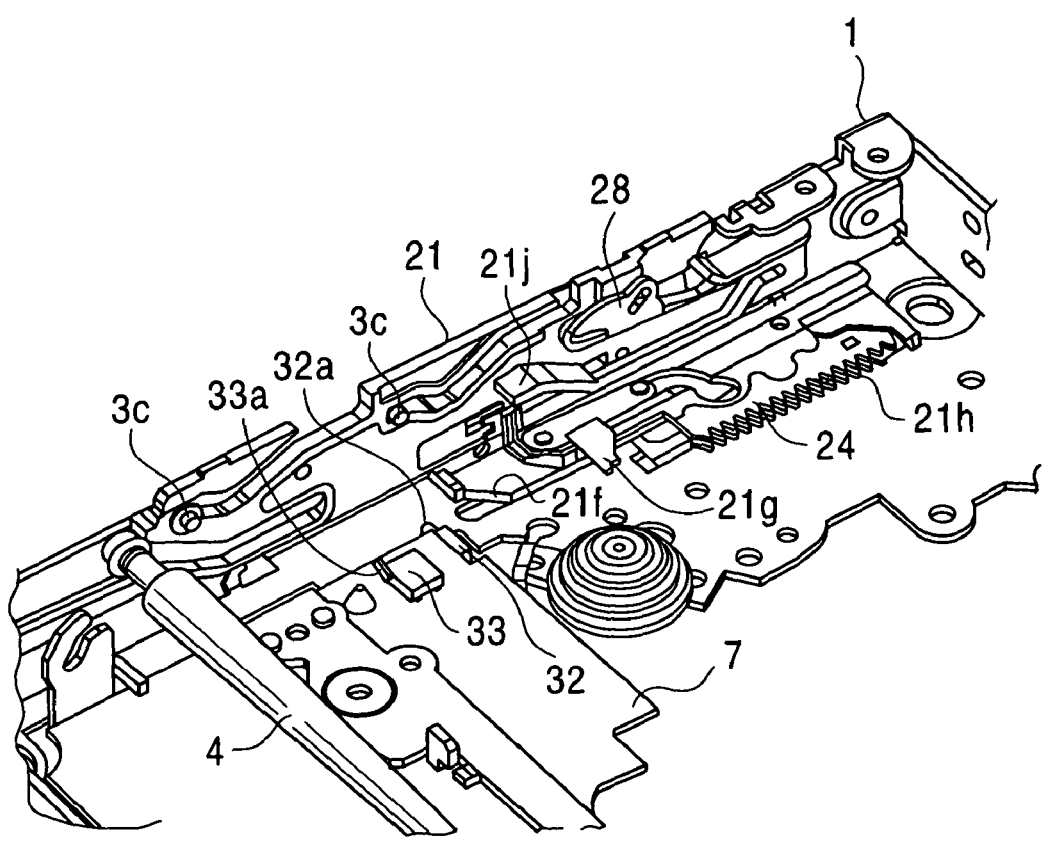
FIG. 11 is a perspective view of the first slide member in an ejected state.
Figure 13:
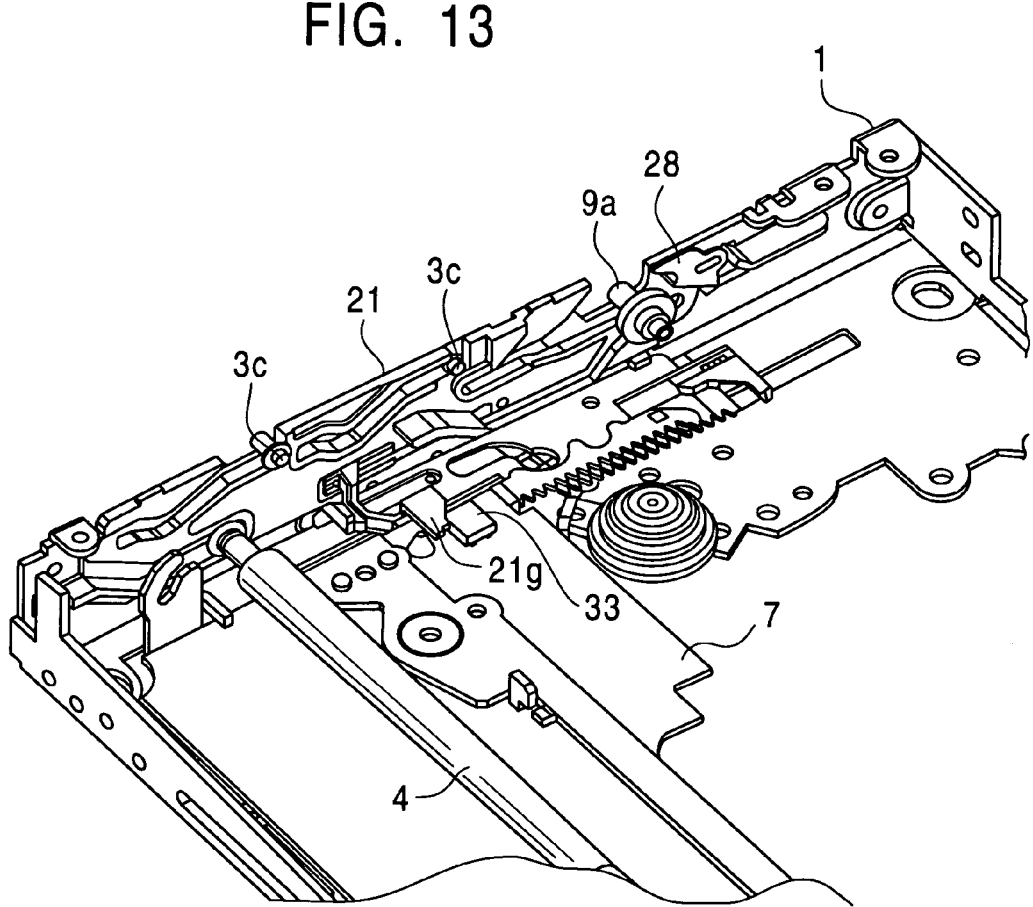
FIG. 13 is a perspective view of the first slide member during play.

The disc player is brought into a playing state as described above. In this playing state, when the spindle motor 12 is driven to rotate, the turntable 13, the disc D, and the clamper 15 rotate integrally so that information is written in and/or read from the disc D by the optical pickup 11. During ejection where the slide members 21 and 22 remain at the retreat position on the remotest side of the chassis 1, as shown in FIG. 11, the second drive portion 21*g* of the first slide member 21 lies away from the actuator portion 33*a* of the second detecting switch 33. Meanwhile, when the slide members 21 and 22 move to the advance position on the nearest side of the chassis 1 so as to bring the disc player into the playing state, as shown in FIG. 13, the second drive portion 21*g* comes into contact with the actuator portion 33*a* so as to turn on the second detecting switch 33. Accordingly, when the rotation of the motor 23 is stopped by using an output signal from the second detecting switch 33 as a road end signal, the slide members 21 and 22 move to the advance position on the nearest side of the chassis 1 and halt at a playing position. Instead of stopping the rotation of the roller 4 upon completion of the above-mentioned transfer of the disc D, the rotation of the roller 4 may be stopped when the second detecting switch 33 turns on. In order to eject the disc D, from which reading information has been completed, to the outside of the main body of the disc player, when an ejection button (not shown) is operated, the motor 23 starts to rotate in the opposite direction so as to perform an operation in a sequence opposite to the above-mentioned operation, so that the first and second slide members 21 and 22 move backward from the advance position and return to the retreat position shown in FIGS. 8A and 8B.

Figure 12:
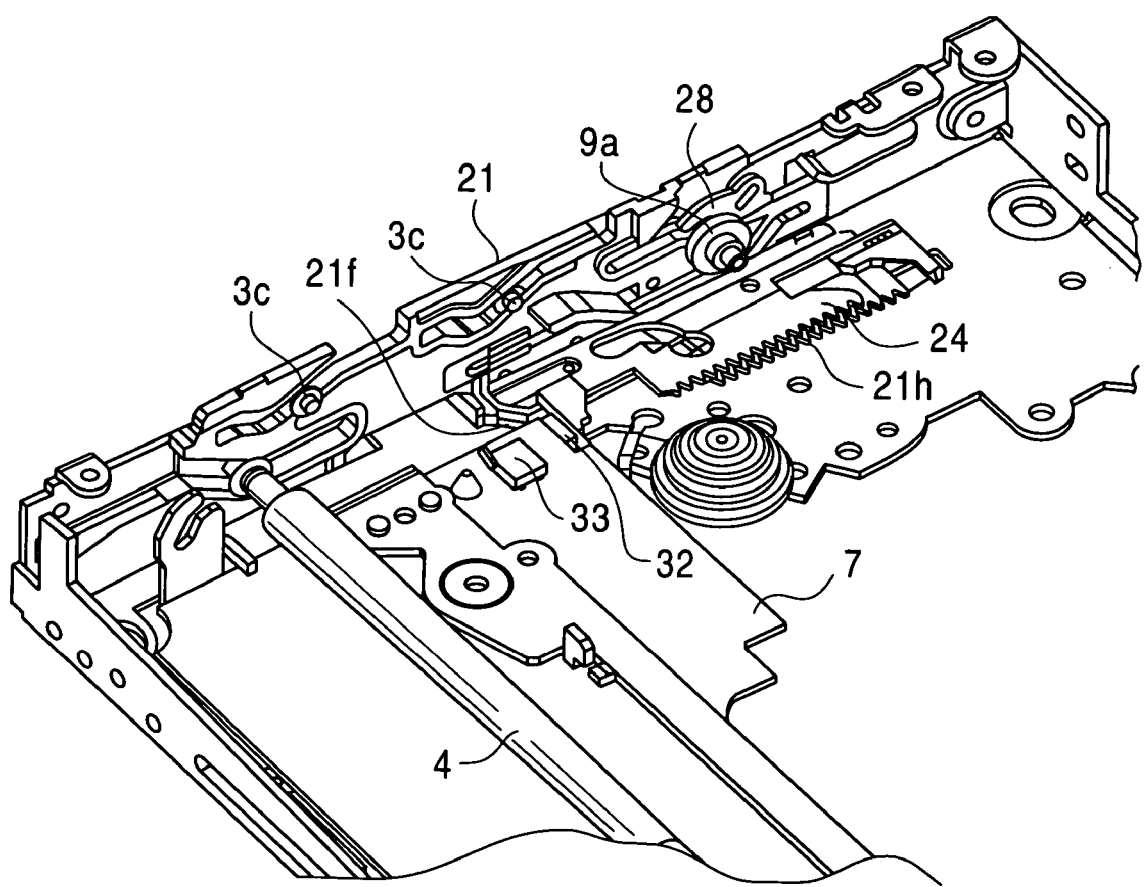
FIG. 12 is a perspective view of the first slide member lying at the half-locked position.

The car-mounted disc player according to a preferred embodiment is arranged such that the slide members 21 and 22 can be brought to a halt at the half-locked position during their assembly or between their final inspection and shipment. More particularly, when the slide members 21 and 22 move from the retreat position shown in FIGS. 8A and 8B to the half-locked position shown in FIGS. 9A and 9B, as shown in FIG. 12, the first drive portion 21*f* of the first slide member 21 abuts against the actuator portion 32*a* so as to activate the first detecting switch 32 to turn on; thus, by stopping the motor 23 in accordance with an operating signal of the first detecting switch 32, the slide members 21 and 22 can be reliably brought into a halt at the half-locked position. Then, as shown in FIG. 3, by inserting the temporal fixing pin 35 into the positioning hole 34 from the outside of the chassis 1 at the half-locked position, and then by latching the front of the temporal fixing pin 35 with the positioning hole or positioning depression (not shown) formed in the first slide member 21, the chassis 1 and the first slide member 21 can be connected to each other so as not to move mutually at the half-locked position as long as the temporal fixing pin 35 is not pulled out.

Accordingly, when the completely assembled car-mounted disc player is shipped and transported from its factory in a state of being loaded with a disc D such as a CD-ROM or DVD, for example, used for navigation, the drive unit 8 is maintained in the locked state while the disc D is being chucked at the half-locked position; therefore, even when a strong external vibration or shock is exerted on the disc player during transport, the loaded disc D is reliably prevented from hitting against the chassis 1 or members and the like fixed to the chassis 1, and thus prevented from damage. Also, when a tilt of a laser beam emitted from the optical pickup 11 is adjusted at the final assembling stage of the disc player while the disc D is being driven to rotate, because the drive unit 8 is maintained in the locked state while the disc D is being chucked at the half-locked position, the disc D can be driven to rotate while the drive chassis 9 having the optical pickup 11 mounted thereon is kept in the locked state, whereby such an adjusting work can be easily done. When the temporal fixing pin 35 is pulled out by a purchaser of the disc player, the chassis 1 and the first slide member 21 are disconnected from each other. Thus, when the disc player is installed at a predetermined location in a car body for operation, the slide members 21 and 22 move back and forth without halting at the half-locked position, whereby the slide members 21 and 22 activate the clamp mechanism and the lock mechanism to perform the respective change-over operations. The disc player may have a CPU or the like having a program previously installed therein for moving the slide members 21 and 22 from the half-locked position to the playing position shown in FIGS. 10A and 10B when the disc player is delivered and has an initial electric power applied thereon.

Although the temporal fixing pin 35 serves as a connecting member for temporally fixing the chassis 1 and the first slide member 21 (and the second slide member 22) at the half-locked position, in place of the temporal fixing pin 35, an adhesive tape, clips, or the like may be used, or a combination of them may be used. Because the rack portion 21h of the first slide member 21 engages with the gear 38 at the half-locked position shown in FIG. 9A, the first slide member 21 is in connection with the motor 23. Accordingly, the temporal fixing pin 35 is not always necessary. However, when such a connecting member is disposed, the slide member 21 is reliably maintained in the half-lock state even when a stronger shock is exerted on the disc player.

Figure 23:
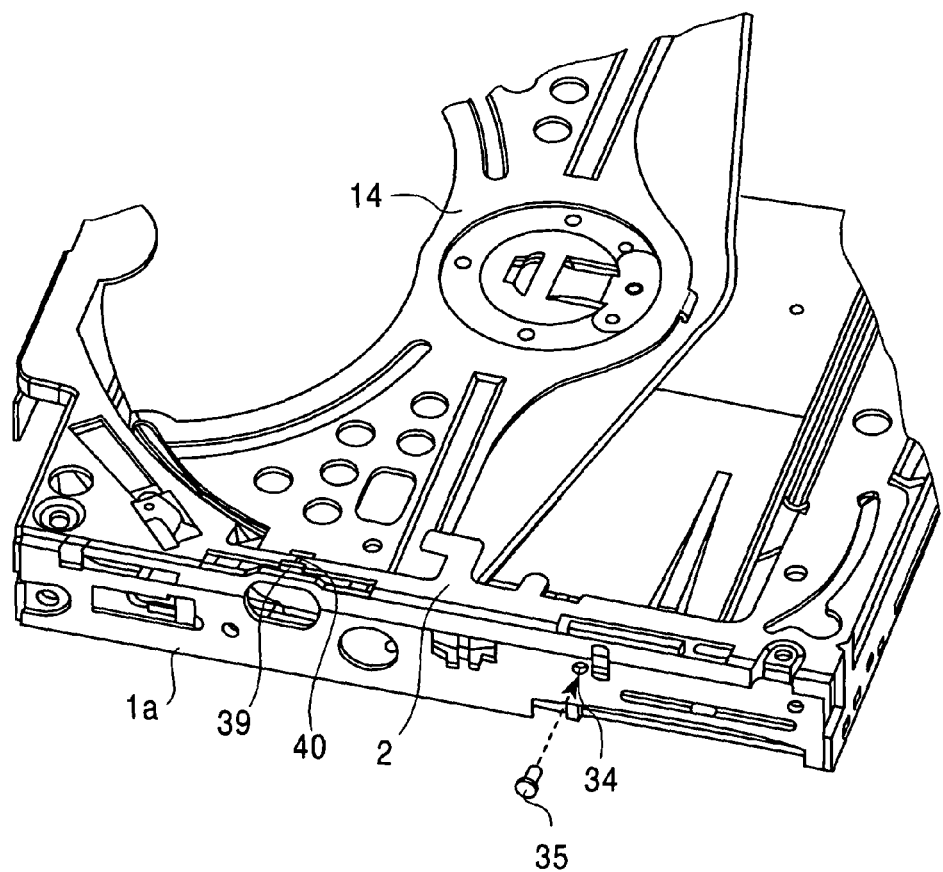
FIG. 23 is a perspective view of a major part of a modification of position-detecting means for detecting a half-locked position.

FIG. 23 is a perspective view of a main part of a modification of the position-detecting means for detecting the half-locked position. As shown in the figure, when a first mark such as a projection 39 is formed on the upper surface of the first slide member 21 integrally therewith and also a second mark such as a groove 40 is formed in the top chassis 2 fixed on the upper portion of the chassis 1 so that the projection 39 and the groove 40 mate with each other at the half-locked position, the half-locked position is visually detected with ease without the first detecting switch 32, whereby the first slide member 21 is reliably halted at this position. In this case, the motor 23 may be energized so as to move the first slide member 21 to the half-locked position; alternatively, the first and second slide members 21 and 22 can be manually moved to the half-locked position. The marks of the position-detecting means at the half-locked position are not limited to the projection 39 and the groove 40; instead, they may be printed marks, engraved marks, or types of marks.

Although the disc D is clamped between the clamper 15 and the turntable 13 by moving down the clamper 15 in the foregoing embodiment, on the contrary, the turntable may be moved up relative to the clamper so as to clamp the disc D therebetween. The lock mechanism and the change-over mechanism are not limited to those in the foregoing embodiment, and can be modified as needed.

Also, in the foregoing embodiment, the regulatory portions 18c and 19c of the respective positioning members 18 and 19 supported on the drive chassis 9 elastically abuts against the lower surface of the arm clamp 14. On the contrary to this arrangement, the regulatory portions 18c and 19c of the respective positioning members 18 and 19 supported on the side of the arm clamp 14 may elastically abut against the upper surface of the drive chassis 9. In this case, the disc D during transfer is prevented from passing over below the two arm levers 18b and 19b.

In addition, in the foregoing embodiment, the turning of the positioning members 18 and 19 causes them to move between the first position at which the small disc SD is positioned and the second position at which the large disc LD is positioned. Alternatively, the positioning members 18 and 19 may be supported on the drive chassis 9 or the arm clamp 14 so as to be slidable in the back-and-forth direction so that the positioning members 18 and 19 move in a sliding manner between the first and second positions. In this case, the regulatory portions 18c and 19c are linearly slidable while elastically abutting against the arm clamp 14 or the drive chassis 9.

Furthermore, although, in the foregoing embodiment, the disc-positioning mechanism according to a preferred embodiment of the present invention is constructed so as to be applicable to a car-mounted disc player which can deal with two types of a small disc SD and a large disc LD, those skilled in the art will appreciate that the disc-positioning mechanism can be also applicable to a car-mounted disc player in which the positioning members 18 and 19 are fixedly disposed and in which information is read from or written in only one type of a disc (for example, a large disc LD).

The invention claimed is:

1. A disc-positioning mechanism for a car-mounted disc player, comprising:
   a drive chassis comprising a turntable and a pickup;
   a clamper-supporting member;
   a clamper rotatably supported on the clamper-supporting member, the clamper operable to clamp a disc between the clamper and the turntable; and
   at least one positioning member abutting against an outer periphery of a disc inserted from a slot, the at least one positioning member comprising an abutment and a regulatory portion, the abutment operable to make contact with the outer periphery of the disc and the regulatory portion extending farther toward the slot than the abutment;
   wherein the clamper-supporting member is operable to move with respect to the drive chassis from a first position where the disc is inserted from the slot to a second position where the disc is clamped between the clamper and the turntable; and
   wherein the at least one positioning member is supported on the drive chassis and the regulatory portion abuts against the clamper-supporting member when the clamper-supporting member is at least at the first position.

2. The disc-positioning mechanism of claim 1, wherein the regulatory portion is made from an elastic member and the elastic member elastically abuts against the clamper-supporting member.

3. The disc-positioning mechanism of claim 2, wherein the regulatory portion is made from a leaf spring comprising a base portion and a free end, the base portion fixed to the positioning member and the free end elastically abutting against the clamper-supporting member.

4. The disc-positioning mechanism of claim 3, wherein the base portion of the leaf spring is fixed to the abutment.

5. The disc-positioning mechanism of claim 1, wherein the positioning member is operable to be moved between a first position in which a small disc is positioned with respect to the turntable and a second position in which a large disc is positioned with respect to the turntable.

6. The disc-positioning mechanism of claim 5 wherein the regulatory portion slides while abutting against the clamper-supporting member when the positioning member moves.

7. The disc-positioning mechanism of claim 5, wherein the positioning member is turnably supported on the drive chassis and the regulatory portion extends outward from the clamper and abuts against a lower surface of the clamper-supporting member.

8. The disc-positioning mechanism of claim 5, wherein the at least one positioning member comprises a pair of positioning members, the pair of positioning members operable to turn in synchronization with each other between the first and second positions.

9. The disc-positioning mechanism of claim 8 wherein the abutment of one of the positioning members is made from a synthetic resin and the abutment of the other positioning member is made from a metal plate.

10. The disc-positioning mechanism of claim 8, wherein a first disc is positioned against the fronts of the abutments of the two positioning members lying at the first position, and a second disc of greater diameter than the first disc is positioned against the inner circumferential surfaces of the abutments of the two positioning members lying at the second position.

11. A disc-positioning mechanism for a car-mounted disc player, comprising:
 a drive chassis comprising a turntable and a pickup;
 a clamper-supporting member;
 a clamper rotatably supported on the clamper-supporting member, the clamper operable to clamp a disc between the clamper and the turntable; and
 at least one positioning member abutting against an outer periphery of a disc inserted from a slot, the at least one positioning member comprising an abutment and a regulatory portion, the abutment operable to make contact with the outer periphery of the disc and the regulatory portion extending farther toward the slot than the abutment;
 wherein the clamper-supporting member is operable to move with respect to the drive chassis from a first position where the disc is inserted from the slot to a second position where the disc is clamped between the clamper and the turntable; and
 wherein the at least one positioning member is supported on the clamper-supporting member and the regulatory portion abuts against the drive chassis when the clamper-supporting member is at least at the first position.

12. The disc-positioning mechanism of claim 11, wherein the regulatory portion is made from an elastic member and the elastic member elastically abuts against the clamper-supporting member.

13. The disc-positioning mechanism of claim 12, wherein the regulatory portion is made from a leaf spring comprising a base portion and a free end, the base portion fixed to the positioning member and the free end elastically abutting against the clamper-supporting member.

14. The disc-positioning mechanism of claim 13, wherein the base portion of the leaf spring is fixed to the abutment.

15. The disc-positioning mechanism of claim 11, wherein the positioning member is operable to be moved between a first position in which a small disc is positioned with respect to the turntable and a second position in which a large disc is positioned with respect to the turntable.

16. The disc-positioning mechanism of claim 15 wherein the regulatory portion slides while abutting against the clamper-supporting member when the positioning member moves.

17. The disc-positioning mechanism of claim 15, wherein the positioning member is turnably supported on the drive chassis and the regulatory portion extends outward from the clamper and abuts against a lower surface of the clamper-supporting member.

18. The disc-positioning mechanism of claim 15, wherein the at least one positioning member comprises a pair of positioning members, the pair of positioning members operable to turn in synchronization with each other between the first and second positions.

19. The disc-positioning mechanism of claim 18 wherein the abutment of one of the positioning members is made from a synthetic resin and the abutment of the other positioning member is made from a metal plate.

20. The disc-positioning mechanism of claim 18, wherein a first disc is positioned against the fronts of the abutments of the two positioning members lying at the first position, and a second disc of greater diameter than the first disc is positioned against the inner circumferential surfaces of the abutments of the two positioning members lying at the second position.

21. A disc-positioning mechanism of a car-mounted disc player, comprising:
 a drive chassis comprising a turntable and a pickup;
 a clamper-supporting member;
 a clamper rotatably supported on the clamper-supporting member and being able to clamp a disc between the clamper and the turntable; and
 a pair of positioning members operable to position a disc inserted through a slot of the disc player by abutting the outer periphery of the disc, wherein each of the positioning members is operable to move between a first locating position at which a first disc is positioned with respect to the turntable and a second locating position at which a second disc having a diameter greater than the first disc is positioned with respect to the turntables;
 wherein each of the positioning members comprises an abutment and a regulatory portion, the abutment operable to make contact with the outer periphery of the first and second disc, and the regulatory portion extending farther toward the slot than the abutment;
 wherein the clamper-supporting member is operable to move with respect to the drive chassis from a first position where the disc is inserted from the slot to a second position where the disc is clamped between the clamper and the turntable; and
 wherein each of the positioning members is supported on either one side of the drive chassis and the clamper-supporting member, and the regulatory portion abuts against the other side when the clamper-supporting member is at least at the first position.

22. The disc-positioning mechanism of claim 21 wherein each of the positioning members comprises an abutment and a regulatory portion made from an elastic member and extending farther toward the slot than the abutment.

23. The disc-positioning mechanism of claim 22 wherein the two positioning members are supported on the drive chassis and the regulatory portion elastically abuts the clamper-supporting member.

24. The disc-positioning mechanism of claim 22 wherein the two positioning members are supported on the clamper-supporting member and the regulatory portion elastically abuts the drive chassis.

* * * * *